US005572236A

United States Patent [19]
Feig et al.

[11] Patent Number: 5,572,236
[45] Date of Patent: Nov. 5, 1996

[54] DIGITAL IMAGE PROCESSOR FOR COLOR IMAGE COMPRESSION

[75] Inventors: Ephraim Feig, Briarcliff Manor; Elliot N. Linzer, Bronx, both of N.Y.

[73] Assignee: International Business Machines Corporation, Armonk, N.Y.

[21] Appl. No.: 151,592

[22] Filed: Nov. 12, 1993

Related U.S. Application Data

[63] Continuation of Ser. No. 922,601, Jul. 30, 1992, abandoned.

[51] Int. Cl.$^6$ .................................................... G09G 5/02
[52] U.S. Cl. ................................... 345/154; 382/25 D
[58] Field of Search ................................ 345/150, 153, 345/154, 155, 199; 358/11, 30, 133, 136, 395, 518; 348/403, 405, 406, 426; 382/248, 250

[56] References Cited

U.S. PATENT DOCUMENTS

| | | | |
|---|---|---|---|
| 4,665,438 | 5/1987 | Miron et al. | 358/181 |
| 4,774,574 | 9/1988 | Daly et al. | 358/133 |
| 4,837,724 | 6/1989 | Borgers et al. | 348/403 |
| 5,146,325 | 9/1992 | Ng | 358/136 |
| 5,163,103 | 11/1992 | Uetani | 382/56 |

OTHER PUBLICATIONS

P. Yang, "Prime Factor Decomposition of the Discrete Cosine Transform and Its Hardware Realization", 1985 IEEE, pp. 772–775.

*Primary Examiner*—Richard Hjerpe
*Assistant Examiner*—Lun-Yi Lao
*Attorney, Agent, or Firm*—Blaney B. Harper; Ronald L. Drumheller

[57] ABSTRACT

This invention minimizes the number of non-trivial multiplications in the DCT process by rearranging the DCT process such that non-trivial multiplications are combined in a single process step. In particular, the DCT equations for the row-column application of the DCT process on k=pq points wherein p and q are relatively prime, are factored into a permutation matrix, a tensor product between matrices having p×p and q×q points, and a matrix whose product with an arbitrary vector having pq points requires pq–p–q+1 additions and/or subtractions. The tensor product is then further factored to remove non-trivial multiplications by developing a a first factor having (pq–p–q+1)/2 non-trivial multiplications and a diagonal matrix. The diagonal matrix is not unique for any set of data. Its j,j-th elements are chosen from a subproduct of the factorization of the tensor product. Once the diagonal matrix elements are chosen the remaining first factor is developed. When the factorization is complete, the diagonal matrix is absorbed into the quantization step which follows the DCT process. The quantization step is the multiplication of a diagonal matrix by the DCT output data. The quantization diagonal matrix is combined with the diagonal matrix of the DCT to form one multiplication process by which non-trivial elements multiply data. This combination of multiplication steps reduces the number of non-trivial multiplications in the DCT process.

76 Claims, 3 Drawing Sheets

DIGITAL IMAGE PROCESSOR FOR COLOR IMAGE COMPRESSION

This is a continuation of application Ser. No. 07/922,601, filed Jul. 30, 1992 now abandoned.

FIELD OF THE INVENTION

This invention relates generally to the field of image processing. In particular, this invention relates to methods and apparatus for digitally representing images and transmitting digital representations of images. More specifically, this invention relates to a method and apparatus for performing forward and inverse Discrete Cosine Transforms of digital images.

BACKGROUND OF THE INVENTION

The display and transmission of visual images is increasingly important for modern communications. In particular, it is important for modern computer driven displays to receive, transmit, and display sequences of images in rapid succession such as is shown in movies. The quality of the visual display can be improved by representing the visual images in a digital format. Generally, a visual image can be represented by dividing the image into sufficiently small picture elements, called pixels, and assigning to each pixel a color and a value representing the intensity of the color for the pixel. For example, a typical 8 inch by 10 inch visual image may be divided into two dimensional array of 768 by 1024 pixels wherein each pixel is further divided into 3 subpixels. The three subpixels are each associated with one of the three primary colors red, green, or blue. Each subpixel is assigned a digital value corresponding to the intensity level for the color of the subpixel. The subpixels are small enough such that the human eye does not resolve each subpixel. Rather, the image presented by a pixel to the viewer is some combination of the three colors associated with each subpixel weighted by the intensity value for each subpixel color. As a result, the visual image is represented by three two dimensional matrices of color intensity values.

This digital image represents a high quality image because the pixels are small. However, as the pixel gets smaller, there are more pixels for the same size image and more intensity values to store, manipulate, and transmit. The fact that more pixels requires more data also results in a reduction in the ability to transmit images because the amount of data for each image transmitted is so large. As a result, various efforts have been made to transform this Red Green Blue (RGB) data into another form of data which can be transmitted and stored efficiently and which can also be re-transformed back into RGB data for display. The new form of data most often chosen relates the RGB data to a luminance value and two chrominance values. In particular, the luminance value represents the intensity of a pixel on a grey scale which provides an accurate representation of the image to a monochrome display. The luminance value is obtained by weighting each intensity value of the RGB data and combining them. For example, the National Television Systems Committee (NTSC) standard luminance value $Y=0.299R+0.587G+0.114B$, wherein R is the red intensity value, G is the green intensity value, and B is the blue intensity value. The two chrominance values convey information which describes how the colors differ from monochrome. For example, the NTSC values $U=Y-B$ and $V=Y-R$. The RGB to YUV transform compacts most of the visual intensity information into the luminance variable. This effect is similar to viewing a color image on a monochrome monitor in that the viewer understands a significant portion of the image but does not understand it all. This effect is useful for reducing the amount of data representing the image because the YUV data can be digitally filtered and coded such that much of the chrominance data, and some of the luminance data, can be discarded and replaced with code values. There are a variety of techniques for performing the filtering process, the most common of which is a Discrete Cosine Transform (DCT). The DCT replaces local blocks of YUV pixel data (such as 6×6 pixels or 8×8 pixels) with data generated from the YUV to DCT conversion performed on the YUV data. The resulting DCT data is very compact and can be easily stored or transmitted. The YUV and DCT conversions are largely, but not exactly invertible, so that the compact data can be re-converted back into a very accurate representation of the digitized image even though the re-converted data is not exactly the same as the original digital image data.

The basic problem with this image conversion process is that even though digital data can be conveniently compacted, through the YUV and DCT conversions, each conversion requires several multiplications, additions and/or subtraction. This is a problem because each multiplication, addition or subtraction requires time for a computer processor to implement. Processing multiple operations for each pixel and processing thousands of pixels per image requires a significant amount of processor time. This amount of processor time is typically large enough to degrade the rate at which sequential images can be displayed. Degrading the display rate degrades the ability to display objects in motion. As a result, either the speed at which the processor multiplies must be increased or the conversion process must be change to require fewer multiplication steps in order to implement high quality motion displays. One prior art attempt at increasing the speed of the multiplications is to replace the multiplication operations with look up tables. Look up tables may reduce the time required for multiplication operations which often are much slower than additions or subtractions because multiplications in the binary number system are typically a series of bit shift and add operations so that the time for each multiplication is a multiple of an add operation. Also, look-up tables are convenient to implement whereas special purpose multiplication hardware is much more complex than special purpose fixed point addition, subtraction and shift hardware. However, even though a look up table decreases the number of multiplication operations, the can be table itself is nor very fast. Moreover, many computer processors are very efficient in using time between multiplications when performing many multiplications because of the pipelined structure of the processor. When look up tables are used in conjunction with computer processors, the pipelined structure can be disrupted and the overall efficiency of image processing is decreased even though the individual look up table operation is faster than the multiplication operation. Therefore, look tip tables have not been very successful in increasing the speed of the image processing.

Beyond improving the speed of the multiplication operation, the prior art has also attempted to reduce the number of non-trivial multiplication steps required in the DCT conversions. A non-trivial multiplication is multiplication by a factor other than two. Multiplication by a factor of two is a shift operation in the binary system. Non-trivial multiplications have been reduced in the prior art by recognizing that the DCT equations contain a fixed constant which can be factored from the DCT equations and combined with another procedure in the DCT process. The problem with this technique is that although there is a reduction in the number of multiplication steps, the reduction is small. In particular, the common factor removed generally multiplies another non-trivial factor which does not reduce the number of multiplication processes.

OBJECTS OF THE INVENTION

It is an object of the present invention to manufacture an improved digital image processor.

It is a further object of the present invention to manufacture a faster digital image processor.

It is still another object of the present invention to manufacture a digital image processor having an improved forward DCT.

It is still a further object of the present invention to manufacture a digital image processor having an improved inverse DCT.

It is still another object of the present invention to manufacture a digital image processor having an improved DCT much reduces the time required for multiplication processes.

It is still a further object of the present invention to manufacture a digital image processor having an improved DCT which reduces the number of multiplication operations performed in the DCT process

SUMMARY OF THE INVENTION

The objects of this invention are accomplished by rearranging the DCT process such that non-trivial multiplications are combined in a single process step. In particular, the DCT equations for the row-column application of the DCT process on k=pq points wherein p and q are relatively prime, are factored into a permutation matrix, a tensor product between matrices having p×p and q×q points, and a matrix whose product with an arbitrary vector having pq points requires pq−p−q+1 additions and/or subtractions. The tensor product is then further factored to remove non-trivial multiplications by developing a a first factor having (pq−p−q+1)/2 non-trivial multiplications and a diagonal matrix. The diagonal matrix is not unique for any set of data. Its j,j-th elements are chosen from a subproduct of the factorization of the tensor product. Once the diagonal matrix elements are chosen the remaining first factor is developed. When the factorization is complete, the diagonal matrix is absorbed into the quantization step which follows the DCT process. The quantization step is the multiplication of a diagonal matrix by the DCT output data. The quantization diagonal matrix is combined with the diagonal matrix of the DCT to form one multiplication process by which non-trivial elements multiply data. This combination of multiplication steps reduces the number of non-trivial multiplications in the DCT process. In addition, the same factorization technique is applicable to the two dimensional direct application of the DCT to a k×k matrix of points. Specifically, the transform matrix on k×k points is defined to be the tensor product of the transform matrix on k points with the transform matrix on k points. This results in the individual factors of the transform matrix on k points forming a tensor product with themselves and demonstrates that the factorization on k points also reduces the number of non-trivial multiplications on the transform matrix on k×k points.

DESCRIPTION OF THE PREFERRED EMBODIMENT

Figure 1:
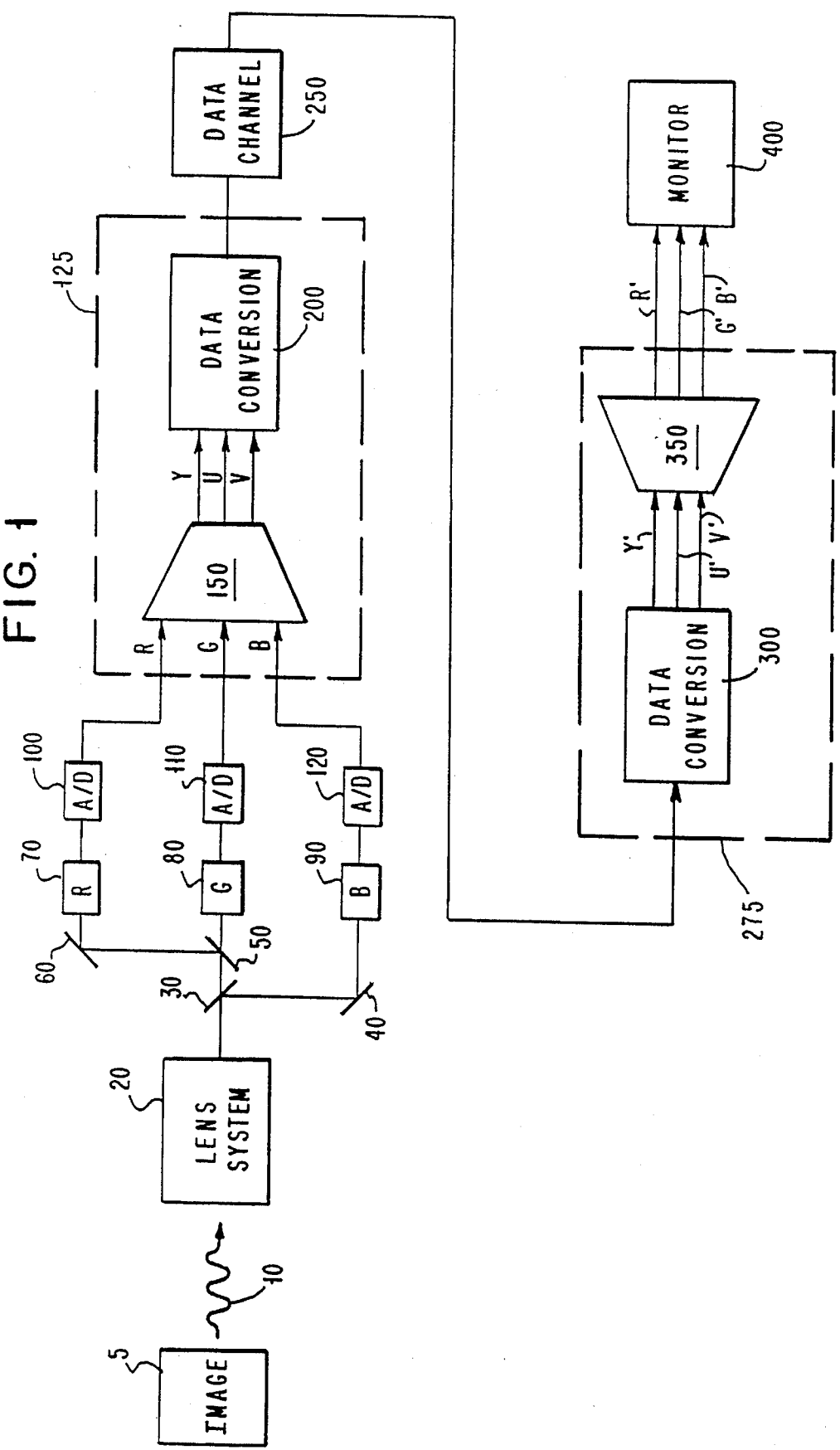
FIG. 1 illustrates one embodiment of a digital image processor system according to the present invention.

FIG. 1 illustrates one embodiment of an apparatus for the formation, transmission, and presentation of a digital image according to the present invention. Source light 10 from an image subject 5 is transmitted by a lens system 20 to a light beam mirror system. The lens system 20 generally consists of an objective lens and a condenser lens for forming the real image and a relay lens for transmitting the real image to the mirror system. The mirror system consists of a blue reflecting dichroic mirror 30 which transmits blue light to sensor means 90 by mirror 40. Similarly, the mirror system uses a red reflecting dichoric mirror 50 to transmit red light to sensor means 70 by mirror 60. The remaining green light is passed directly through the mirror system to sensor 80. Each of the sensor means is a two dimensional array of light sensitive elements in which each element senses an intensity level of the light and converts that intensity level into an analog electrical signal. Each element in the red sensor array has a corresponding element in the green and blue sensor arrays so that the addition of red, green, and blue colors having the intensity level for a particular element results in the composite light signal produced by lens system 20 for that particular element. The output of each element in the two dimensional array of sensor elements is sent to an analog to digital (A/D) converter. The analog signals produced by red sensor means 70 is sent to A/D converter 100, the output of green sensor means 80 is sent to A/D converter 110, and the output of blue sensor means 90 is sent to A/D converter 120. The A/D converters convert the analog signals into a two dimensional matrix of digital values representing the intensity of light for each element in the red, green, and blue sensors. The accuracy of the A/D converters in this embodiment is 8 bits but this accuracy could be a variety of values such as 4, 6, or 10 bits. The A/D converters create data for one two dimensional matrix having one value of a given accuracy for each element in the matrix for each of the three colors red, green, and blue. The creation of the matrices of digital values representing the color sensor outputs, called RGB data, can be created in a variety of conventional methods other than described above. For example, scanning means or artificial creation of the color data generated by conventional computers are typical methods of generating the RGB data. All of these methods have in common the fact that the RGB data is a representation of a physical measurement of light intensity for each element of the two dimensional array of color sensor elements.

Once the RGB data has been created, the data is transformed and coded. In particular, the RGB data is transformed into YUV data in which the Y value represents the luminance value of the composite RGB data for a single element in the two dimensional array in the corresponding red, green, and blue sensors. Also, the U and V values represent the (Y−blue) and (Y−red) values, respectively, of the composite RGB data for a single element in this two dimensional array. The three two dimensional matrices containing digital RGB data are converted into three two dimensional matrices in which one matrix has Y data, one matrix has U data, and one matrix has V data. The RGB data is transformed into YUV data by transform means 150 because YUV data can be coded for transmission more efficiently than RGB data. In particular, RGB data transformed into YUV data is sent to data conversion means 200 which selectively filters the data, quantizes the filtered data, and encodes the quantized filtered data for transmission. The selective filtration of the YUV data is accomplished through a filter means such as a discrete cosine transform (DCT). The DCT selectively reduces the amount of YUV data required to recreate an image. The RGB to YUV transform compacted a substantial amount of visual information into the luminance variable for each element of the two dimensional array so that much of the U and V data is not required to recreate the visual image. The DCT filter systematically removes and combines YUV data which is not required to accurately reproduce the image.

After the YUV data has been filtered through the DCT, it is then quantized. The quantization normalizes the filtered YUV (data and then rounds the normalized data off to the nearest binary integer. This step is required because it is more efficient to transmit a large volume of data having a normalized distribution rather than a large volume of random data. The quantization process contains a multiplication step in which each filtered vector of YUV data is multiplied by a constant which normalizes the YUV data. Finally, the normalized data is encoded for digital transmission by a process such as a Huffman coding process and then the coded data is converted into electrical or optical signals which are transmitted over a data channel 250. The Huffman (or similar) coding procedure compresses the quantized YUV data into a serial bit stream which can be conveniently transmitted. Conventional electrical conversion devices covert the serial bit stream into electrical signals which are then applied to electrical transmission wires for carrying the electrical signals. The code to signal conversion devices could also be optical or electromagnetic devices which transform the serial bit stream into optical or electromagnetic signals which would then be applied to the optical media (such as fiber optic cables) or electromagnetic media (such as the atmosphere).

Data channel 250 comprises a transmitter, receiver, and interconnection media. The interconnection media can be electrical or optical, or can be merely atmospheric in the case of satellite transmission. Conventional data transmitters transmit data through the interconnection media to a conventional data receiver which sends the data to a decoding unit. The DCT filter, normalization, and encoding processes associated with the data conversion means 200 are reversible through the data conversion means 300. The data conversion means 300 decodes the encoded data, descales it, and performs an inverse DCT (IDCT) on the decoded data. The IDCT generates Y'U'V' data which is similar to but not the same as the YUV data which started the process. The Huffman coding, normalization, and the DCT of data conversion means 200 can be inverted, however the quantization process cannot be completely reversed. The quantization process cannot be completely reversed because once part of the data is truncated that truncated part cannot be recovered. Therefore, when the inverse DCT (IDCT) is performed on the de-coded and descaled Huffman code, the resulting Y'U'V' data is not the same as the YUV data which started the process. After the Y'U'V' data has been generated it is sent to a Y'U'V' to R'G'B' transform means 350. Transform means 350 converts the Y'U'V' data into R'G'B' data which is then sent to a monitor. The monitor 400 reproduces images from the R'G'B' data. The reproduced images arc perceived as essentially identical to the original images which generated the RGB data even though the RGB and R'G'B' data are different.

The transform means 150 and data conversion means 200 form processor 125. The data conversion means 300 and inverse transform means 350 form inverse processor 275. A central element to both the processor and inverse processor is the RGB to YUV transform and inverse transform operation. Specifically, the transform means converts RGB data to YUV data according to the following function: $Y=0.299R+0.587G+0.114B$ and $U=Y-B$ and $V=Y-R$.

Figure 2:
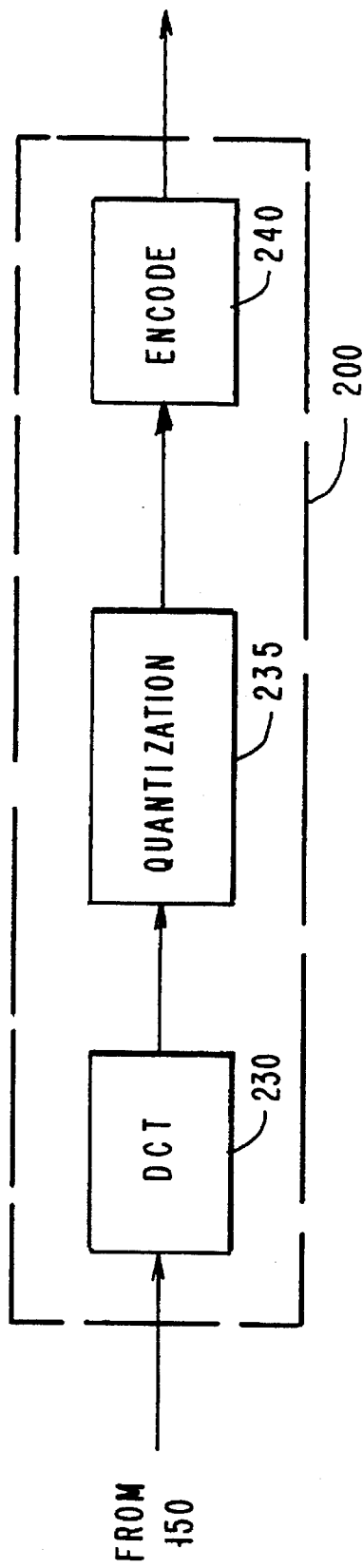
FIG. 2 illustrates one embodiment of data conversion means according to the present invention.

Once all the RGB data has been converted to YUV data, the YUV data for each pixel is sent to data conversion means 200. FIG. 2 illustrates that the data conversion means 200 filters, quantizes, and codes the data for transmission. The filter process 230 is a Discrete Cosine Transform (DCT) process in which pixel groups of YUV data are transformed into DCT data through the DCT transform. The DCT transform function weights the Y, U, and V data such that only the data to which the human eye is sensitive is retained. In particular, each of the Y, U, and V matrices of pixel values are divided up into groups of pixels having k×k elements such as 6×6, 8×8, 12×12, etc.. The data within each group of pixels for each matrix is replaced by DCT transform data. For example, if X (having elements x(i,j)) represents the data within each of the 36 pixels (for 6×6 pixel grouping) in each of the Y, U, and V matrices, then the resulting DCT data $\Gamma_y=AX_yA^t$ wherein the DCT transform matrix A has elements $$a(i,j) = c_i \cos[\pi i(2j + 1)/2N]$$

for i,j=0,1,2, ... k−1 and where $$c_0 = 1/\sqrt{N}$$

and $$c_i = \sqrt{2}/\sqrt{N}$$

when i>0. Similarly, $\Gamma_u=AX_uA^t$ and $\Gamma_v=AX_vA^t$. The DCT transform is repeated for each group of 36 pixels in each 6×6 matrix of Y, U, and V data. The DCT transform can be implemented in a variety of embodiments. One embodiment of the DCT transform means is a combination of a multiplier and memory which implements a two stage multiplication process. Specifically, the first stage multiplies the columns of X by A and stores the results in a temporary memory. That is, the transform matrix A is applied to a series of 1-dimensional vectors having k elements. The results of this operation are stored to create the product matrix AX. The rows of this resulting matrix are 1-dimensional vectors of data, each of which are multiplied by $A^t$ to create the final product $\Gamma$. This specific procedure is called the row-column method for implementing the DCT. This procedure can also be carried out with look-up tables, special purpose multipliers, ALUs, or other devices suitable for manipulating digital data.

The row-column procedure for implementing the DCT transform function multiplies a series of 1-dimensional data vectors having k elements by the transform matrix A. This procedure requires requires $2K^3$ multiplications and $2K^2(K-1)$ additions/subtractions for a K×K matrix of input data X when the transform matrix is explicitly multiplied by the data vectors. This number of multiplications is excessively large. This problem of excessive multiplications is substantially decreased in this embodiment of the invention because the transform matrix A is factored in a specific manner which decreases the number of non-trivial multiplications. In particular, A is factored into a diagonal factor and a scaled factor such that the diagonal factor can be absorbed into a later quantization step and the scaled factor can be multiplied by the data vector with a minimum of non-trivial multiplications. The 1-dimensional DCT transform matrix on k points, $A_k$, is initially scaled as:

$$E_k \tilde{S}_k = A_k, \quad (1)$$

where $E_k$ is a diagonal matrix $$E_k = \sqrt{1/k} \ Diag(1, \sqrt{2}, \ldots, \sqrt{2}) \quad (2)$$

whose entries are the constants $c_i$ of the DCT transform, and $\tilde{S}_k$ is the remaining factor. The number of points, k, is generally 6, so that $A_k$ is typically 6×6, but k can also be 12, or another number. The number of points k is also a product of a pair of relatively prime numbers. Two numbers are relatively prime if they do not share a common factor except For the factor 1. For example, 2 and 3 are relatively prime as well as 3 and 4. Thus we may have k=pq, with p, q relatively prime, $\tilde{S}_{pq}$ is the scaled factor and is the initial scaling matrix.

The transform matrix $\tilde{S}_{pq}$ is further scaled so that not only the constants of the DCT $c_i$ are factored out but factors which cause non-trivial multiplications are also removed. In particular, equation (1) is re-written as:

$$D_k S_k = A_k, \quad (3)$$

where $$E_k^{-1} D_k S_k = \tilde{S}_k, \quad (4)$$

and where $D_k$ is a secondary factor which is k×k diagonal matrix that factors out as many non-trivial multiplications (other than the constants $c_1$ which are factored out by $E_k$) as possible using a k×k diagonal matrix. This process results in the matrix $S_K$ which is to be multiplied by the YUV data subsets and for which computing its product by the YUV data subsets requires considerably fewer non-trivial multiplications than $A_k$. $D_k$ is later absorbed into the quantization process in a similar manner to $E_k$. The use of this factorization process reduces the number of non-trivial multiplications in $S_k$ to 1 for a 6 point. DCT process and to 6 for a 12 point DCT process.

The determination of $D_k$ and $S_k$ is derived from the identity $\tilde{S}_{pq} = R(\tilde{S}_p \otimes \tilde{S}_q)P$ where "$\otimes$" denotes the tensor product operation, P is a permutation matrix, and R is a matrix whose product with an arbitrary vector having pq points requires a computation using only pq−p−q+1 additions and/or subtractions. The matrix R is a k×k matrix whose elements are determined depending on the value of data vector indicies μ=0 to p−1 and ν=0 to q−1. The matrix R is an addition matrix; that is, its product by an arbitrary vector involves only additions and subtractions. Because p and q are relatively prime, for every integer τ there exist uniquely integers μ and V such that $$\tau = \mu q + \tilde{\nu} p.$$

Thus every integer τ between 0 and k=pq can be associated with a unique pair of integers μ and ν where $$\mu = \tilde{\mu} \bmod p \quad 0 \leq \mu \leq p-1$$
$$\nu = \tilde{\nu} \bmod q \quad 0 \leq \nu \leq q-1$$

An arbitrary k-dimensional vector V(τ) can be thus permuted to its so-called doubly-lexicographic ordered w(μ, ν) where the ordering is (0,0),(1,0),(2,0), ..., (p−1,0),(0,1), (1,1),(2,1), ..., (p−1,1),(2,0),(2,1),(2,2), ..., (2,q−1), ..., (0,q−1),(1,q−1),(2,q−1), ..., (p−1,q−1). The matrix R is the matrix which multiplies an arbitrary doubly-lexicographically ordered vector w and produces an output vector (Rw) wherein:

$$(Rw)(\tau) = w(\mu, \nu) \quad (5)$$

when μν=0; otherwise (when both μ and ν are not 0), the outputs are determined as follows: write $$\tau_1 = |\mu q - \nu p|,$$
$$\tilde{\tau}_2 = \mu q + \nu p.$$

$$\tau_2 = \begin{cases} \tilde{\tau}_2 & \text{if } \tilde{\tau}_2 < k \\ \tilde{\tau}_2 - 2k & \text{if } \tilde{\tau}_2 > k; \end{cases}$$

if $\tau_2 < k$ then $$\begin{cases} (Rw)(\tau_1) = w(\mu,\nu) + w(p-\mu, q-\nu) \\ (Rw)(\tau_2) = w(\mu,\nu) - w(p-\mu, q-\nu) \end{cases} \quad (6a)$$

and if $\tau_2 > k$ then $$\begin{cases} (Rw)(\tau_1) = w(\mu,\nu) - w(p-\mu, q-\nu) \\ (Rw)(\tau_2) = w(\mu,\nu) + w(p-\mu, q-\nu) \end{cases} \quad (6b)$$

Given the matrices R and P, $\tilde{S}_{pq}$ is re-written as follows:

$$\begin{aligned}
\tilde{S}_{pq} &= R(\tilde{S}_p \otimes \tilde{S}_q)P \quad (7)\\
&= R((E_p^{-1} D_p S_p) \otimes (E_q^{-1} D_q S_q))P\\
&= R[(E_p^{-1} D_p) \otimes (E_q^{-1} D_p)](S_p \otimes S_q)P
\end{aligned}$$

and $$R[(E_p^{-1} D_p) \otimes (E_q^{-1} D_q)] = \tilde{D}_{p \otimes q} RT, \quad (8)$$

where $\tilde{D}_{p \otimes q}$ is a pq×pq diagonal matrix whose j,j-th term is any of the non-zero entries in the j-th row of $R(E_p^{-1} D_p) \otimes (E_q^{-1} D_q)$. The j-th row of $R(E_p^{-1} D_p) \otimes (E_q^{-1} D_q)$ will have either one or two non-zero entries, and the choice of either of these entries for the diagonal matrix $\tilde{D}_{p \otimes q}$ is proper. T is a pq×pq matrix determined once $\tilde{D}_{p \otimes q}$ is chosen. That is, T is solved for from equation (8) once $\tilde{D}_{p \otimes q}$ and R are known. Let $D_{p \otimes q} = (E_p \otimes E_q)\tilde{D}_{p \otimes q}$ and let $S_{p \otimes q} = S_p \otimes S_q$. Then, since $A_{pq} = E_{p+e,\text{ou}} \otimes_{+ee \ q} S_{pq'}$ $$A_{pq} = D_{p \otimes q} R T S_{p \otimes q} P. \quad (9)$$

This factorization provides efficient processes for multiplying $A_{pq}$ by the data matrix X which is shown by examples below having k=pq=6, 12 corresponding to p=3 and q=2, 4, respectively. The product by $D_{p \otimes q}$ will be absorbed into the quantization step because it is a diagonal matrix which effectively multiplies the data pointwise by constants. The quantization procedure is explained below. The product by $D_{p \otimes q}$ is never explicitly calculated because it is absorbed into the quantization process and so these multiplication steps are eliminated from the transform process. The product by T requires $(pq-p-q+1)/2$ multiplications. The product by P involves no arithmetic operations because P is a permutation matrix. The product by R requires $pq-p-q+1$ additions/subtractions. The remainder of the computation will involve the product by $S_{(p \otimes q)}$, which is determined in each case explicitly, and as show below, is relatively cheap to compute.

Explicit factorizations for the transform matrices $A_6$ and $A_{12}$ are provided below for illustration purposes. The factorizations depend on the choices of quantities for the corresponding $\tilde{D}_{p \otimes q}$ matrices, and as a result the factorizations are not unique. Nevertheless, the other similar factorizations will provide transform multiplications which are similarly efficient to the ones illustrated here. The first step is to factor $A_p = D_p S_p$ for $p=2, 3, 4$ as these factors will be used as building blocks in determining the factorization of $A_{pq}$.

$$A_2 = \begin{pmatrix} \sqrt{2}/2 & 0 \\ 0 & \sqrt{2}/2 \end{pmatrix} \begin{pmatrix} 1 & 1 \\ 1 & -1 \end{pmatrix}. \tag{10}$$

$$A_3 = \begin{pmatrix} \alpha_1 & 0 & 0 \\ 0 & \alpha_2 & 0 \\ 0 & 0 & \alpha_3 \end{pmatrix} \begin{pmatrix} 1 & 1 & 1 \\ 1 & 0 & -1 \\ 1 & -2 & 1 \end{pmatrix}. \tag{11}$$

where $\alpha_1 = \sqrt{3}/3, \alpha_2 = \sqrt{2}/2, \alpha_3 = \sqrt{6}/6$.

$$A_4 = D_4 S_4, \tag{12}$$

with $$S_4 = B_3 B_2 B_1 B_0,$$

and $$B_0 = \begin{pmatrix} 1 & 0 & 0 & 1 \\ 0 & 1 & 1 & 0 \\ 1 & 0 & 0 & -1 \\ 0 & 1 & -1 & 0 \end{pmatrix},$$

$$B_1 = \begin{pmatrix} 1 & 1 & 0 & 0 \\ 1 & -1 & 0 & 0 \\ 0 & 0 & 1 & 0 \\ 0 & 0 & 1 & 1 \end{pmatrix},$$

$$B_2 = \begin{pmatrix} 1 & 0 & 0 & 0 \\ 0 & 1 & 0 & 0 \\ 0 & 0 & 1 & 0 \\ 0 & 0 & 0 & \sqrt{2}/2 \end{pmatrix},$$

$$B_3 = \begin{pmatrix} 1 & 0 & 0 & 0 \\ 0 & 0 & 1 & 1 \\ 0 & 1 & 0 & 0 \\ 0 & 0 & 1 & -1 \end{pmatrix},$$

$$D_4 = \begin{pmatrix} 1/2 & 0 & 0 & 0 \\ 0 & \alpha_4 & 0 & 0 \\ 0 & 0 & 1/2 & 0 \\ 0 & 0 & 0 & \alpha_5 \end{pmatrix},$$

where $\alpha_4 = \cos(3\pi/8)$ and $\alpha_5 = \cos(\pi/8)$.

The explicit factorization of $A_6$ is $$A_6 = D_{2 \otimes 3} R_6 T_6 S_{2 \otimes 3} P_6 \tag{13}$$

where $S_{(2 \otimes 3)} = \Phi_1 \Phi_2$, and wherein $$P_6 = \begin{pmatrix} 1 & 0 & 0 & 0 & 0 & 0 \\ 0 & 0 & 0 & 0 & 1 & 0 \\ 0 & 0 & 0 & 0 & 0 & 1 \\ 0 & 0 & 1 & 0 & 0 & 0 \\ 0 & 1 & 0 & 0 & 1 & 0 \\ 0 & 0 & 0 & 1 & 0 & 0 \end{pmatrix},$$

$$\Phi_2 = \begin{pmatrix} 1 & 1 & 1 & 0 & 0 & 0 \\ 1 & 0 & -1 & 0 & 0 & 0 \\ 1 & -2 & 1 & 0 & 0 & 0 \\ 0 & 0 & 0 & 1 & 1 & 1 \\ 0 & 0 & 0 & 1 & 0 & -1 \\ 0 & 0 & 0 & 1 & -2 & 1 \end{pmatrix},$$

$$\Phi_1 = \begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & -1 & 0 & 0 \\ 0 & 1 & 0 & 0 & -1 & 0 \\ 0 & 0 & 1 & 0 & 0 & -1 \end{pmatrix},$$

$$T_6 = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & \sqrt{3} & 0 \\ 0 & 0 & 0 & 0 & 0 & 1 \end{pmatrix},$$

$$R_6 = \begin{pmatrix} 1 & 0 & 0 & 0 & 0 & 0 \\ 0 & 0 & 0 & 0 & 1 & 1 \\ 0 & 1 & 0 & 0 & 0 & 0 \\ 0 & 0 & 0 & 1 & 0 & 0 \\ 0 & 0 & 1 & 0 & 0 & 0 \\ 0 & 0 & 0 & 0 & 1 & -1 \end{pmatrix},$$

$$D_{2 \otimes 3} = \begin{pmatrix} \alpha_1 & 0 & 0 & 0 & 0 & 0 \\ 0 & \alpha_2 & 0 & 0 & 0 & 0 \\ 0 & 0 & 1/2 & 0 & 0 & 0 \\ 0 & 0 & 0 & \alpha_1 & 0 & 0 \\ 0 & 0 & 0 & 0 & \alpha_3 & 0 \\ 0 & 0 & 0 & 0 & 0 & \alpha_2 \end{pmatrix},$$

where $\alpha_1 = \sqrt{6}/6, \alpha_2 = \sqrt{6}/12$, and $\alpha_3 = \sqrt{3}/6$.

The product by $D_{2 \otimes 3}$ is not explicitly computed, but rather absorbed into the scaling process as explained below. Therefore, the 6-point scaled DCT, $S_6$, is of the form $$S_6 = R_6 T_6 \Phi_1 \Phi_2 P_6, \tag{14}$$

and the only non-trivial multiplication arises from the product by $T_6$. Computing the product of a vector by $S_6$ requires, therefore 16 additions/subtractions plus 2 shifts plus 1 multiplication.

The inverse scaled transform $S_6^{-1}$ is as easily computed as the transpose of scaled transform $S_6$, because the transform $A_k$ (for every k) is orthogonal so that the inverse is the matrix transform. In particular, $$A_6^{-1} = A_6^t = P_6^t \Phi_2^t \Phi_1^t T_6^t R_6^t D_{2 \otimes 3}, \tag{15a}$$

and its implementation uses the same number of multiplications, additions/subtractions, and shifts as the scaled-transform. Alternately, an inverse scaled-DCT on 6 points can be obtained via the direct inversion formula $$A_6^{-1} = P_6^t \Phi_2^{-1} \Phi_1^{-1} T_6^{-1} R_6^{-1} D_{2\otimes 3}^{-1}, \qquad (15b)$$

The entires of each column of the matrix $R_6^{-1}$ are either five 0s and one entry 1, or four 0s, one entry 0.5 and one entry −0.5. The 0.5, −0.5 entries can therefore also be absorbed into the descaling process. It should be appreciated that the scale factor $D_{2\otimes 3}$ appears in different forms in the two factorizations above, which leads to different descaling constants in the inverse procedures, as will be discussed below.

It should also be appreciated that because $$\sqrt{3} \approx 1.732,$$

is also well approximated by 1.75=2−0.25, both forward and inverse scaled-DCTs on 6 points can be well approximated by replacing every multiplication by $\sqrt{3}$ with 2 shifts and a subtraction. In particular, an image an which is to be decoded with a 6-point inverse DCT may well be decoded with such an approximate inverse scaled-DCT and the resulting image will be approximately identical to the ideally decoded image. Computing this approximate inverse scaled-DCT on 6 points requires 17 addition/subtractions and 4 shifts. A similar approximation can be made for the forward scaled-DCT on 6 points. These approximate forward and inverse scaled-DCT transforms can be used in row-column fashion to yield approximate 2-dimensional forward and inverse scaled-DCT transforms each of which which uses no multiplications, 204 additions/subtractions and 48 shifts. This performance is significantly improved over prior art implementations of the transform operation which requires at least 48 multiplications and approximately the same number of additions/subtractions and shifts.

Another explicit example of the factorization process is provided below on 12 points for p=3 and q=4. Specifically, $$A_{12} = {}_{3\otimes 4} R_{12} T_{12} S_{3\otimes 4} P_{12},$$

where $$S_{3\otimes} = \Phi_2 K \Phi_1,$$

$$D_{3\otimes 4} = \text{Diag}(\beta_1, \beta_2, \tfrac{1}{4}, \beta_3, \beta_4, \beta_5, \beta_1, \beta_2, \beta_6, \beta_7, \tfrac{1}{4}, -\beta_5)$$

with $$\beta_1 = \sqrt{3}/6, \; \beta_2 = \cos(3\pi/8)/2, \; \beta_3 = \cos(3\pi/8)/\sqrt{3},$$

$$\beta_4 = \sqrt{2}/4, \; \beta_5 = \cos(\pi/8)/2$$

$$\beta_6 = \sqrt{6}/12, \; \beta_7 = \cos(\pi/8)/\sqrt{3},$$

$$R_{12} = \begin{pmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 1 \\ 0 & 0 & 0 & 0 & 0 & 1 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 1 & 0 & 0 & 1 & 0 \\ 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & -1 \\ 0 & 0 & 0 & 0 & 0 & 0 & 0 & 1 & 0 & 0 & 0 & 0 \\ 0 & 0 & 0 & 1 & 0 & 0 & 0 & 0 & 0 & 0 & 0 & 0 \\ 0 & 0 & 0 & 0 & 0 & 1 & 0 & 0 & 0 & -1 & 0 & 0 \\ 0 & 0 & 0 & 0 & 0 & 0 & 0 & 1 & 0 & 0 & -1 & 0 \end{pmatrix},$$

$$T_{12} = \text{Diag}(1, 1, 1, 1, 1, 1, 1, 1, 1, 2\beta_1, (\beta_3/2\beta_5), (\beta_7/2\beta_2),),$$

$$\Theta_2 = R_3 \otimes R_4,$$

where $$R_3 = \begin{pmatrix} 1 & 1 & 1 \\ 1 & 0 & -1 \\ 1 & -2 & 1 \end{pmatrix},$$

and $$B_5 = \begin{pmatrix} 1 & 0 & 0 & 0 \\ 0 & 1 & 0 & 0 \\ 0 & 0 & 1 & 1 \\ 0 & 0 & 1 & -1 \end{pmatrix},$$

$$\Theta_1 = I_3 \otimes (B_1 B_0),$$

where $I_3$ is the 3×3 identity matrix and the matrices $B_1 B_0$ were described above in the earlier factorization for $A_4$, $$K = \text{Diag}(1, 1, 1, \sqrt{2}/2, 1, 1, 1, \sqrt{2}/2, 1, 1, 1, \sqrt{2}/2),$$

and $$P_{12} = \begin{pmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 1 \\ 0 & 0 & 0 & 0 & 0 & 0 & 0 & 1 & 0 & 0 & 0 & 0 \\ 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 \\ 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \end{pmatrix}.$$

The scaled DCT on 12 points corresponds to the matrix $S_{12} = R_{12} T_{12} S_{3\otimes 4} P_{12}$. To compute the product by $S_{12}$ via this factorization requires 6 multiplications (3 for $T_{12}$ and 3 for K; the multiplications in the $D_{3\otimes 4}$ factor are absorbed into the quantization); 49 additions/subtractions (6 for $R_{12}$, 22 for $\Phi_2$ and 21 for $\Phi_1$) and 4 shifts (for $\Phi_2$). Again, as in the 6 point transform, the 12 point transform is orthogonal and so its inverse is its transpose, and the computation of its product requires the same number of multiplications, additions/subtractions, and shifts. Also, the conventional implementations of such a transform require at least 23 multiplications, as compared to 6 multiplications in this embodiment, and approximately the same number of additions/subtractions and shifts.

The present invention is also applicable to the 2-dimensional DCT applications which further reduce the number of multiplications or the DCT. The 2-dimensional DCT on K×K points is a linear operator $A_{k \times k}$ whose matrix representation is given as the tensor product $$A_{k \times k} = A_k \otimes A_k. \quad (17)$$

For our case of interest, K=pq with p,q relatively prime, we use the tensor identity $$\begin{aligned} A_{pq} \otimes A_{pq} &= (D_{p \otimes q} R T S_{p \otimes q} P) \otimes (D_{p \otimes q} R T S_{p \otimes q} P) \quad (18) \\ &= (D_{p \otimes q} \otimes D_{p \otimes q})(R \otimes R)(T \otimes \\ & \quad T)(S_{p \otimes q} \otimes S_{p \otimes q})(P \otimes P) \end{aligned}$$

The factor $(D_{p \otimes q} \otimes D_{p \otimes q})$ is a diagonal matrix corresponding to those scale factors which can be absorbed into the quantization routine. Computation of the product by $(R \otimes R)$ is done in row-column fashion. Computation of the products by $(T \otimes T)$ and $(S_{p \otimes q} \otimes S_{p \otimes q})$ can be done in row-column fashion, but can also be done directly. The direct method depends on the particular parameters p, q, as described by example below. The computation of the product by the permutation matrix $(P \otimes P)$ involves no arithmetic operations.

More specifically, the 2-dimensional scaled DCT on 6×6 points can be handled via the identity $$S_6 \otimes S_6 = (R_6 \otimes R_6)(\Phi_1 \otimes \Phi_1)(\Phi_2 \otimes \Phi_2)(T \otimes T)(R \otimes R).$$

wherein the matrices $P_6$, $\Phi_1$, $\Phi_2$, $T_6$, $R_6$, are the same as those given in the 1-dimensional 6 point example. The addition steps are done in row-column fashion using 12×16= 192 additions/subtractions plus 12×2=24 shifts. The multiplication step may be done either in row-column fashion using 12 multiplications, or in a more efficient way, based on the tensor identity for $(T_6 \otimes T_6)$. This matrix is diagonal, with diagonal entries all 1 except for 10 entries which are $\sqrt{3}$ and 2 entries which are 3. Hence computing the multiplication stage can be done with 10 multiplications, 2 shifts and 2 additions. Algorithmically, the product by $(T_6 \otimes T_6)$ on a 6×6 input array is obtained as follows: columns 1,2,3,4,6 are multiplied by $T_6$ and column 5 is multiplied by $\sqrt{3}T_6$. The five products by $T_6$ each use 5 multiplications by $\sqrt{3}$. while the product by $\sqrt{3}T_6$ uses 5 products by $\sqrt{3}$ and 1 product by 3, the latter which could be done with a shift and an addition. It should be observed that here too the products by $\sqrt{3}$ may be replaced by approximations, as described in the 1-dimensional 6 point example.

The 2-dimensional implementation of the scaled DCT (SDCT) on 12×12 points via the row-column method would require 24 times the number of arithmetic operations used in the 1-dimensional DCT example: 144 multiplications, 1176 additions/subtractions and 96 shifts. The two dimensional DCT implementation via the direct tensor product formulation reduces the number of multiplications further. All the additions/subtractions sections would be done in row-column fashion, so that the count of 1176 would remain the same. The product by $(T_{12} \otimes T_{12})$ can be done with 63 multiplications, and the product by $(K \otimes K)$ can be done with 54 multiplications and 9 shifts. Algorithmically, the product by $(T_{12} \otimes T_{12})$ on a 12×12 input array is obtained as follows: columns 1–9 are each multiplied by $T_{12}$ with 9 multiplications; column 10 is multiplied by $2\beta_1 T_{12}$ with 12 multiplications; column 11 is multiplied by $(\beta_3/2\beta_5) T_{12}$ with 12 multiplications; column 12 is multiplied by $(\beta_7/2\beta_2) T_{12}$ with 12 multiplications. The product by $(K \otimes K)$ on a 12×12 input array is obtained as follows: columns 1,2,3,5, 6,7,9,10,11 are each multiplied by K with 3 multiplications; columns 4,8,12 are each multiplied by $(\sqrt{2}/2K)$ with 9 multiplications and 3 shifts. Hence the 2-dimensional implementation of a SDCT on 12×12 points can be done with 117 multiplications (compared with 144 multiplications in the row-column approach using 24 1-dimensional applications to the 12×12 array), 1176 additions/subtractions, and 105 shifts (compared with 96 shifts in the row-column implementation). The trade-off is 27 multiplications for 9 shifts in trading the 1-dimensional row-column method for the direct 2-dimensional DCT implementation.

After the SDCT data has been generated, FIG. 2 illustrates that the SDCT data is quantized through the quantization step 235. The quantization process is a two step procedure in which the SDCT data is scaled then rounded to the nearest integer. The scaling process is a multiplication step in which each of the M×N SDCT data values for each of the three Y, U, and V matrices is multiplied by a constant which is usually predetermined experimentally once and for all and accounts for the characteristics of the human visual system. In the standard DCT compression scheme, each of the pq×pq blocks in each of the Y, U, V matrices which is transformed via the DCT, after transformation, is multiplied pointwise by the reciprocal of a predetermined quantity $\eta_{i,j}, 0 \le i, j \le pq-1$. The pq×pq matrix $(\eta_{i,j})$ is often called the quantization matrix, and the pointwise multiplication is called scaling. This matrix may vary for each of the various color planes Y, U and V. The generation of scaling matrices is a known art. If the block output of the DCT is $\hat{x}_{i,j}$, then the block output after scaling is $b_{i,j} = \hat{x}_{i,j}/\eta_{i,j}$. The present invention utilizes scaled-DCTs, and absorbs the diagonal matrix $D_{p \otimes q}$ into the scaling process. A pq×pq scaling matrix whose entries are $\bar{\eta}_{i,j} = \eta_{i,j}/d_{i,j}$ is introduced, wherein $d_{i,j}$ is the (jp+i)-th entry of the diagonal matrix $D_{p \otimes q}$. The output $\bar{x}_{i,j}$ of the scaled-DCT is scaled by pointwise multiplication by the reciprocals of the entries from this new scaling matrix, yielding $\bar{b}_{i,j} = \bar{x}_{i,j}/\bar{\eta}_{i,j}$. The quantities $b_{i,j}$ and $\bar{b}_{i,j}$ can be made arbitrarily close by computing with sufficiently high precision. Digital multipliers which have a sufficient number of bits (approximately two times the number of bit of the highest accuracy multiplicand) to maintain the accuracy associated with the multiplicands are used.

Figure 3:
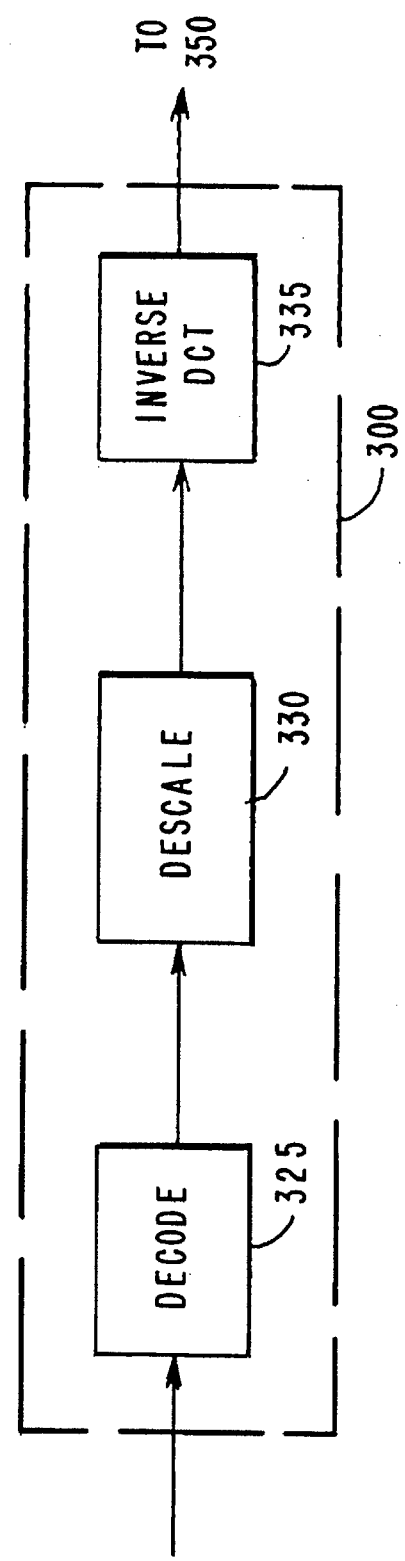
FIG. 3 illustrates a second embodiment of a data conversion means according to the present invention.

Once the DCT data has been quantized, FIG. 2 illustrates that the data is coded by a data coding process 240 such as Huffman coding. Huffman coding is implemented in a look-up table which substitutes variable length code words for fixed length words of input data. Coding means 240 can also comprise a variety of digital implementations of coding processes, such as ALUs, dedicated multipliers or shift and add units, or other special purpose devices for manipulating digital data. After the data is coded, it is converted into digital signals, and then transmitted over the data channel 250 by data drivers. The data channel medium may be electrical, optical, or electromagnetic, and as a result, conversion devices which translate individual data bits into signal pulses (and vice versa) may be electrical, electro-optic, or electromagnetic devices. Similarly, data drivers (or transmitters) and data sensors (or receivers) may be electrical, optical, or electromagnetic devices. FIG. 3 illustrates that after transmission, the processor 275 receives the transmitted data and the data conversion means 300 decodes, descales, and applies an inverse scaled-DCT process to the transmitted data. The transmitted data is initially decoded through an inverse coding procedure 325, such as an inverse Huffman coding procedure. Once the data is decoded, it must be descaled 330 and have the inverse scaled-DCT operation 335 performed on it in order to generate YUV form data. Once the YUV form data is generated, the inverse RGB conversion can take place to generate RGB form data for display on a monitor.

The data conversion means 300 of FIG. 1 is the complementary means to the data conversion means 200. FIG. 3 more fully illustrates the data conversion means 300. For example, if a Huffman coding method is used in coding process 240, then a Huffman de-coding means is used in de-code process 325 illustrated in FIG. 3. Here, a Huffman de-coding procedure is implemented in look-up tables or other similar devices for manipulating digital data. The output of the decoding process is three M×N matrices of quantized, scaled-DCT data. The data conversion means 300 also includes the descaling 330 and inverse-scaled DCT (ISDCT) transformation 335 processes. The descaling step 330 is only a multiplication step as opposed to a multiplication arid truncation step as in the quantization process. This is because once data has been truncated, then the truncated part of the data is lost and it cannot be retrieved. The multiplication step in the descaling process multiplies each of the elements in the three M×N matrices of decoded data by a predetermined constant and reverses the normalization process of the compression process. In the standard DCT decompression scheme, each of the pq×pq blocks in each of the $\Gamma_y, \Gamma_u, \Gamma_v$ matrices is multiplied pointwise by the quantity $\eta_{i,j}, 0 \leq i,j \leq pq-1$ which appears as an entry in the quantization matrix. This pointwise multiplication is called descaling. If one such block of decoded DCT data is $b_{i,j}$, then the block output after descaling is $z_{i,j}=b_{i,j}\eta_{i,j}$. The present invention utilizes inverse scaled-DCTs, and absorbs the diagonal matrix $D_{p \otimes q}$ into the descaling process. As discussed above (equations 15a abd 15b), the inversion procedure is based either on inversion via transposition or via direct inversion. In the embodiment where inversion is performed via transposition, as was suggested by equation 15a, a pq×pq descaling matrix whose entries are $\tilde{\eta}_{i,j}=\eta_{i,j}d_{i,j}$ is used, wherein $d_{i,j}$ is the (jp+i)-th entry of the diagonal matrix $D_{p \otimes q}$. The block entry values $\bar{b}_{i,j}$ are multiplied pointwise by entries from this new descaling matrix, yielding $\bar{z}_{i,j}=\bar{b}_{i,j}\tilde{\eta}_{i,j}$. In the embodiment where inversion is performed via direct inversion, as was suggested by equation 15b, a pq×pq descaling matrix whose entries are $\tilde{\eta}_{i,j}=\eta_{i,j}/d_{i,j}$ is used, wherein $d_{i,j}$ is the (jp+i)-th entry of the diagonal matrix $D_{p \otimes q}$. The block entry values $\bar{b}_{i,j}$ are multiplied pointwise by entries from this new descaling matrix, yielding $\bar{z}_{i,j}=\bar{b}_{i,j}\tilde{\eta}_{i,j}$. Under both methods, the quantities $z_{i,j}$ and $\bar{z}_{i,j}$ can be made arbitrarily close by computing with sufficiently high precision. Digital multipliers which have a sufficient number of bits (approximately two times the number of bit of the highest accuracy multiplicand) to maintain the accuracy associated with the multiplicands are used. It will be appreciated that in the second method corresponding to direct inversion, the resulting descaling matrix is identical to the scaling matrix used in the forward procedure After the descaling process 330, an ISDCT process 335 is applied to the resulting data. In the present embodiment, implementation of the ISDCT is done via the transposition method as explained above. The factorization of the inverse scaled-transform matrix is very similar to the forward SDCT transform because the DCT matrix is orthogonal which means its inverse is its transpose. This means that to obtain the inverse transform matrix, the individual factors need only be rearranged rather than recomputed. The resulting ISDCT outputs represent three matrices having Y', U', and V', data. The Y'U'V' matrices are not exactly identical to the YUV data at the encoder side of the process because of the quantization losses, but they are approximately identical.

Once the Y'U'V' data has been generated, it is sent to transform means 350 for conversion to R'G'B' data. Specifically, the transform means converts Y'U'V' data to R'G'B' data according to the following function: R'=Y'−V' and G'=Y'+0.194G'+0.509B' and B'=Y'−U' data. The R'G'B' matrices are not exactly identical to the YUV data which began the process because of the quantization losses, but they are approximately identical.

Figure 4:
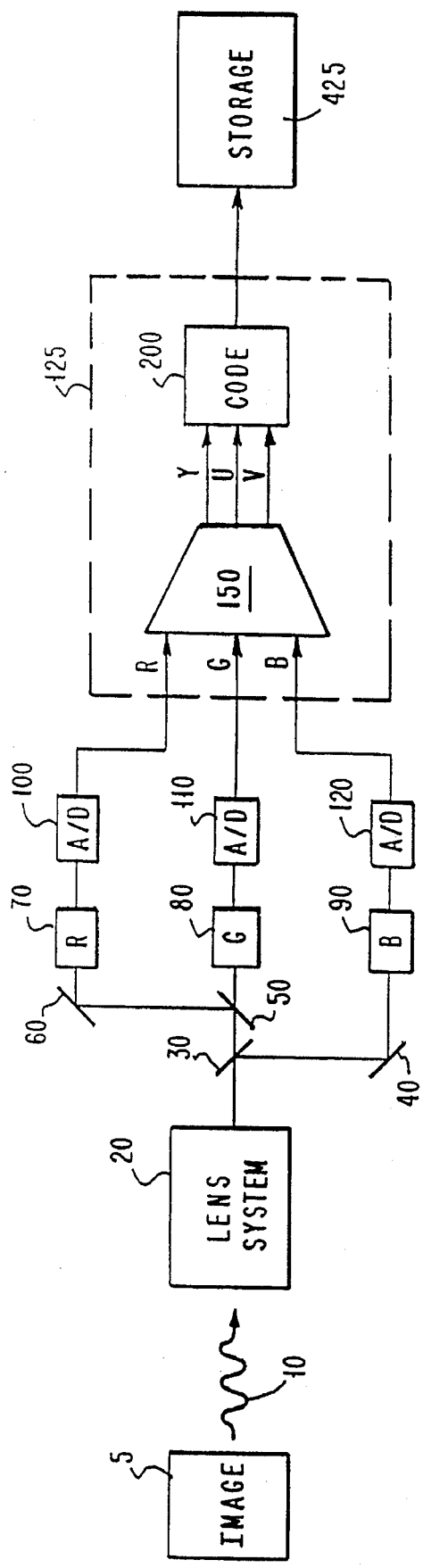
FIG. 4 illustrates another embodiment of a digital image processing system according to the present invention.
Figure 5:
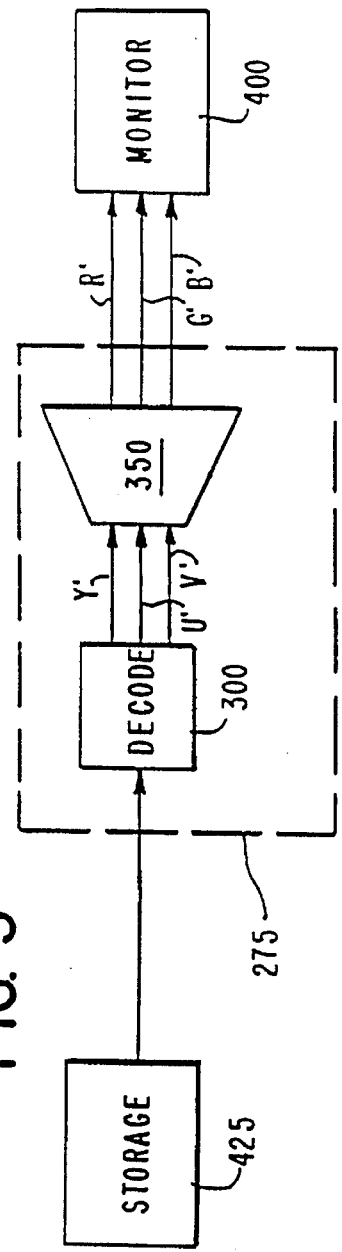
FIG. 5 illustrates a further embodiment of a digital image processing system according to the present invention.

The forward SDCT process described here can be used with conventional inverse DCT techniques to yield images visually identical to those processed with conventional forward DCT techniques. Similarly, the inverse SDCT conversion described here can be used with conventional forward DCT techniques to yield images visually identical to those processed with conventional inverse color conversion. This means that the forward DCT techniques used to implement particular transformations are separate from the techniques used to implement inverse transformations. FIG. 4 illustrates that coded data from code means 200 can be stored in storage means 425 to be used separately by other image processing systems having decoding and inverse DCT conversion means which are different from that described here. Similarly, FIG. 5 illustrates that DCT data stored in storage means 425, can be decoded and converted via the techniques of the present invention for display on a monitor even though the stored data did not take advantage of the forward SDCT conversion processes described in this invention. Storage means 425 in either the embodiment for storing images or displaying images according to this invention can be conventional electrical, optical, or electromagnetic storage means for storing digital data.

This invention is also particularly applicable to processes for enlarging and reducing images. Specifically, many scanners which generate image data, have 125 dots per inch (dpi) input sensors, and many image displays have outputs of 92 dpi. Thus, a 125 to 92 dpi scale is required in order to display images at their physical size. This works out to be very close to a ¾ scale (0.736). A fast way to do this scale, and retain high quality is very useful as it helps to attain performance targets, while also maintaining uniformity in the system by displaying images at the correct physical size. A fast inverse DCT on 6×6 points applied to the leading 6×6 entries of the DCT components and then scaled pointwise by a factor of ¾ does just that. The pointwise scale is accomplished by multiplying a reduction factor (i.e. ¾) by each element in the diagonal matrix $D_{(p \otimes q)}$ and incorporating the matrix $D_{(p \otimes q)}$ into the descaling step. This is because in-verse DCTs reconstruct the image using basis functi in the 8-point case, along each of the 2 dimensions, the basis functions are a constant (the DC component), a half cycle of the cosine function sampled at 8 equally spaced places, a full cycle of the cosine function sampled at 8 equally spaced places, one and a half cycles of the cosine function sampled at 8 equally spaced places, etc., up to three and a half cycles of the cosine function sampled at 8 equally spaced places. The DCT coefficients are the weights given to these basis functions in the linear reconstruction. When only the first 6 are used, with the same coefficients, the reconstruction yields a DC component, a half cycle of the cosine function sampled at 6 equally spaced places, a full cycle of the cosine function sampled at 6 equally spaced places, one and a half cycles of the cosine function sampled at 6 equally spaced places, etc., up to two and a half cycles of the cosine function sampled at 6 equally spaces places. The new reconstruction lacks the highest two frequency components and the interpolation is via the sampling at different places along the cosine curve. Because the power in the original DCT coefficients was obtained using 64 values, and the newly reconstructed 6×6 yields 36 values, a ¾ uniform scaling brings the final intensity values down to an appropriate range. Also, a fast DCT on 12×12 points applied to a 12×12 array whose leading 8×8 entries are the DCT components and the rest are 0 yields an image which is 1.5 times the size of the normally reproduced image and can be used as an effective image enlarger, when the image data is stored in the DCT domain, as is the case with images stored under the emerging standards from the International Standards Organization Joint Photographic Experts Group (ISO/JPEG). Also, DCTs of various sizes are important for independent applications whereby the images are processed with DCTs which are sizes 6, 12, or other composite values which are products of two relatively prime integers.

While the invention has been described and illustrated with respect to plural embodiments thereof, it will be understood by those skilled in the art that various changes in the detail may be made therein without departing from the spirit, scope, and teaching of the invention. Therefore, the invention disclosed herein is to be limited only as specified in the following claims.

We claim:

1. A method for transmitting an image over a data channel, comprising:

representing an image with RGB form data;

transforming said RGB form data into YUV data;

converting said YUV data into DCT data by multiplying a factored transform matrix $S_k$ to a plurality of subsets of said YUV data having k points wherein $k=pq$ and p and q are relatively prime integers;

said factored transform matrix $S_k$ being the product of: $RTS_{p \otimes q}P$, wherein:

R forms a product with an arbitrary vector having pq points using at most $pq-p-q+1$ additions and/or subtractions;

P comprises a permutation matrix;

a tensor product between a SDCT matrix on p points $(S_p)$ and a SDCT matrix on q points $(S_q)$ form $S_{(p \otimes q)}$;

$T=D_{p \otimes q}^{-1}R[(E_p^{-1}D_p) \otimes (E_q^{-1}D_q)]R^{-1}$ wherein $E_p$ and $E_q$ are initial factors, and $D_p$ and $D_q$ are secondary factors for scaled transform matrices on p and q points respectively, and $D_{(p \otimes q)}=(E_p \otimes E_q)\tilde{D}_{(p \otimes q)}$; and where $\tilde{D}_{p \otimes q}$ comprises a pg×pg diagonal matrix having each j,j-th term selected from any of the non-zero entries in the j-th row of $R[(E_p^{-1}D_p) \otimes (E_q^{-1}D_q)]$;

quantizing said DCT data;

converting said quantized DCT data into signals for transmission over said data channel; and applying said signals to said data channel.

2. A method for transmitting an image over a data channel, as in claim 1, wherein:

said quantization step absorbs $D_{(p \otimes q)}$.

3. A method for transmitting an image over a data channel, as in claim 2, wherein:

a shift and add step multiplies said YUV data by a close approximation to $\sqrt{3}$.

4. A method for transmitting an image over a data channel, as in claim 2 wherein:

each of said plurality of subsets of said YUV data has 6 points.

5. A method for transmitting an image over a data channel, as in claim 2, wherein:

each of said plurality of subsets of said YUV data has 12 points.

6. A method for transmitting an image over a data channel, comprising:

representing an image with RGB form data;

transforming said RGB form data into YUV data;

converting said YUV data into DCT data by multiplying a factored transform matrix $S_k$ to a plurality of subsets of said YUV data having k×k points wherein $k=pq$ and p and q are relatively prime integers;

said factored transform matrix $S_k$ being the product of: $(R \otimes R)(T \otimes T)(S_{(p \otimes q)} \otimes S_{(p \otimes q)})(P \otimes P)$, wherein:

R forms a product with an arbitrary vector having pq points using at most $pq-p-q+1$ additions and/or subtractions;

P comprises a permutation matrix;

a tensor product between a SDCT matrix on p points $(S_p)$ and a SDCT matrix on q points $(S_q)$ form $S_{(p \otimes q)}$;

$T=D_{p \otimes q}^{-1}R[(E_p^{-1}D_p) \otimes (E_q^{-1}D_q)]R^{-1}$ wherein $E_p$, and $E_q$ are initial factors and $D_p$ and $D_q$ are secondary factors for scaled transform matrices on p and q points respectively, and $D_{(p \otimes q)}=(E_p \otimes E_q)\tilde{D}_{(p \otimes q)}$; and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

quantizing said DCT data;

converting said quantized DCT data into signals for transmission over said data channel; and applying said signals to said data channel.

7. A method for transmitting an image over a data channel, as in claim 6, wherein:

said quantization step absorbs $D_{(p \otimes q)}$.

8. A method for transmitting an image over a data channel, as in claim 7, wherein:

a shift and add step multiplies said YUV data by a close approximation to $\sqrt{3}$.

9. A method for transmitting an image over a data channel, as in claim 7, wherein:

each of said plurality of subsets of said YUV data has 36 points.

10. A method for transmitting art image over a data channel, as in claim 7, wherein:

each of said plurality of subsets of said YUV data has 144 points.

11. A method for displaying an image on a monitor, comprising:

sensing coded data representing said image from a data channel;

decoding said sensed data into DCT form data;

descaling said DCT form data;

converting said DCT data into YUV data by multiplying a plurality of subsets of said DCT data having k points by a factored transform matrix $S_k'$ wherein $k=pq$ and p and q are relatively prime integers;

said factored transform matrix $S_k'$ being the product of: $P^t S_{(p \otimes q)}' T^t R^t$, wherein:

$R^t$ forms a product with an arbitrary vector having pq points using at most $pq-p-q+1$ additions and/or subtractions;

$P^t$ comprises a permutation matrix;

a tensor product between an ISDCT matrix on p points $(S_p')$ and an ISDCT matrix on q points $(S_q')$ form $S_{(p \otimes q)}'$;

$T^t$ is the transpose of $T = D_{p \otimes q}^{-1} R[(E_p^{-1}D_p) \otimes (E_q^{-1}D_q)]R^{-1}$ wherein $E_p$ and $E_q$ are initial factors, and $D_p$ and $D_q$ are secondary factors for scaled transform matrices on p and q points respectively, and $D_{(p \otimes q)} = (E_p \otimes E_q) \tilde{D}_{(p \otimes q)}$; and where $\tilde{D}_{p \otimes q}$ comprises a pqxpq diagonal matrix having each j,j-th term selected from any of the non-zero entries in the j-th row of $R[(E_p^{-1}D_p) \otimes (E_q^{-1}D_q)]$;

converting said YUV data into RGB form data; and applying said RGB data to said monitor input to display said image on said monitor.

12. A method for displaying an image on a monitor, comprising:

sensing coded data representing said image from a data channel;

decoding said sensed data into DCT form data;

descaling said DCT form data;

converting said DCT data into YUV data by multiplying a plurality of subsets of said DCT data having k points by a factored transform matrix $S_k^{-1}$ wherein k=pq and p and q are relatively prime integers;

said factored transform matrix $S_k^{-1}$ being the product of: $P^t S_{(p \otimes q)}^{-1} T^{-1} R^{-1}$, wherein:

$R^{-1}$ forms a product with an arbitrary vector having pq points using at most pq–p–q+1 additions and/or subtractions;

$p^t$ comprises a permutation matrix;

a tensor product between an ISDCT matrix on p points $(S_p^{-1})$ and an ISDCT matrix on q points $(S_q^{-1})$ form $S_{(p \otimes q)}^{-1}$;

$T^{-1} = R[(E_p^{-1}D_p) \otimes (E_q^{-1}D_q)]^{-1}R^{-1}D_{p \otimes q}$ wherein $E_p$ and $E_q$ are initial factors and $D_p$ and $D_q$ are secondary factors for scaled transform matrices on p and q points respectively, and $D_{(p \otimes q)} = (E_p \otimes E_q) \tilde{D}_{(p \otimes q)}$; and where $\tilde{D}_{p \otimes q}$ comprises a pqxpq diagonal matrix having each j,j-th term selected from any of the non-zero entries in the j-th row of $R[(E_p^{-1}D_p) \otimes (E_q^{-1}D_q)]$;

converting said YUV data into RGB form data; and applying said RGB data to said monitor input to display said image on said monitor.

13. A method for displaying an image on a monitor, as in claim 11, wherein:

said descaling step absorbs $D_{(p \otimes q)}$.

14. A method for displaying an image on a monitor, as in claim 12, wherein: said descaling step absorbs $D_{(p \otimes q)}$.

15. A method for displaying an image on a monitor, as in claim 13, wherein:

a shift and add step multiplies said YUV data by a close approximation $\sqrt{3}$.

16. A method for displaying an image on a monitor, as in claim 14, wherein:

a shift and add step multiplies said YUV data by a close approximation $\sqrt{3}$.

17. A method for displaying an image on a monitor, as in claim 13, wherein:

each of said plurality of subsets of said YUV data has 6 points.

18. A method for displaying an image on a monitor, as in claim 14, wherein:

each of said plurality of subsets of said YUV data has 6 points.

19. A method for displaying an age on a monitor, as in claim 13, wherein:

each of said plurality of subsets of said YUV data has 12 points.

20. A method for displaying an image on a monitor, as in claim 14, wherein:

each of said plurality of subsets of said YUV data has 12 points.

21. A method for displaying an image on a monitor, comprising:

sensing coded data representing said image from a data channel;

decoding said sensed data into DCT form data;

descaling said DCT form data;

converting said DCT data into YUV data by multiplying a plurality of subsets of said DCT data having kxk point by a factored transform matrix $S_k^t$, wherein k=pq and p and q are relatively prime integers;

said factored transform matrix $S_k^t$ being the product of: $(P^t \otimes P^t)(S_{(p \otimes q)}^t \otimes S_{(p \otimes q)}^t)(T^t \otimes T^t)$ $(R^t \otimes R^t)$, wherein:

$R^t$ forms a product with an arbitrary vector having pq points using at most pq–p–q+1 addition and/or subtractions;

$P^t$ comprises a permutation matrix;

a tensor product between a ISDCT matrix on p points $(S_p^t)$ and a ISDCT matrix on q points $(S_q^t)$ form $S_{(p \otimes q)}^t$;

T is the transpose of $T = D_{p \otimes q}^{-1} R[(E_p^{1-D}{}_p) \otimes (E_q^1 - D_q)]R^{-1}$ wherein $E_p$ and $E_q$ are initial factors, and $D_p$ and $D_q$ are secondary factors for scaled transform matrices on p and q points respectively, and $D_{(p \otimes q)} = (E_p \otimes E_q) \tilde{D}_{(p \otimes q)}$; and where $\tilde{D}_{p \otimes q}$ comprises a pqxpq diagonal matrix having each j,j-th term selected from any of the non-zero entries in the j-th row of $R[(E_p^{-1}D_p) \otimes (E_q^{-1}D_q)]$;

converting said YUV data into RGB form data; and applying said RGB data to said monitor input to display said image on said monitor.

22. A method for displaying an image on a monitor, comprising;

sensing coded data representing said image from a data channel;

decoding said sensed data into DCT form data;

descaling said DCT form data;

converting said DCT data into YUV data by multiplying a plurality of subsets of said DCT data having kxk points by a factored transform matrix $S_k^{-1}$, wherein k=pq and p and q are relatively prime integers;

said factored transform matrix $S_k^{-1}$ being the product of: $(P^{-1} \otimes P^{-1})(S_{(p \otimes q)}^{-1} \otimes S_p \otimes q)^{-1})$ $(T^{-1} \otimes T^{-1})(R^{-1} \otimes R^{-1})$, wherein:

$R^{-1}$ forms a product with an arbitrary vector having pq points using at most pq–p–q+1 additions and/or subtractions;

$P^{-1}$ comprises a permutation matrix;

a tensor product between a ISDCT matrix on p points $(S_p^t)$ and a ISDCT matrix on q points $(S_q^t)$ form $S_{p(\otimes q)}^{-1}$;

$T^{-1}$ is the inverse of $T = D_{p \otimes q}^{-1} R[(E_p^{-1}D_p) \otimes (E_q^{-1}D_q)]R^{-1}$ wherein $E_p$ and $E_q$ are initial factors, and $D_p$ and $D_q$ are secondary factors for scaled transform matrices on p and q points respectively, and $D_{(p \otimes q)} = (E_p \otimes E_q) \tilde{D}_{(p \otimes q)}$; and where $\tilde{D}_{p \otimes q}$ comprises a pqxpq diagonal matrix having each j,j-th term selected from any of the non-zero entries in the j-th row of $R[(E_p^{-1}D_p) \otimes (E_q^{-1}D_q)]$;

converting said YUV data into RGB form data; and applying said RGB data to said monitor input to display said image on said monitor.

23. A method for displaying an image on a monitor, as in claim 21, wherein:

said descaling step absorbs $D_{(p \otimes q)}$.

24. A method for displaying an image on a monitor, as in claim 22, wherein:

said descaling step absorbs $D_{(p \otimes q)}$.

25. A method for displaying an image on a monitor, as in claim 23, wherein:

a shift and add step multiplies; said YUV data by a close approximation to $\sqrt{3}$.

26. A method for displaying an image on a monitor, as in claim 24, wherein:

a shift and add step multiplies said YUV data by a close approximation to $\sqrt{3}$.

27. A method for displaying an image on a monitor, as in claim 23, wherein:

each of said plurality of subsets of said YUV data has 36 points.

28. A method for displaying an image on a monitor, as in claim 24, wherein:

each of said plurality of subsets of said YUV data has 36 points.

29. A method for displaying an image on a monitor, as in claim 23, wherein:

each of said plurality of subsets of said YUV data has 144 points.

30. A method for displaying an image on a monitor, as in claim 24, wherein:

each of said plurality of subsets of said YUV data has 144 points.

31. A method for displaying an image on a monitor, comprising:

sensing coded data representing said image from a data channel;

decoding said sensed data into DCT form data having 6×6 point subblocks;

descaling said DCT form data;

converting said DCT data into YUV data by multiplying a plurality of subsets of said DCT data having 6 points by a factored transform matrix $S_6^t$;

said factored transform matrix $S_6^t$ being the product of: ${}^tS_{(2 \otimes 3)}{}^tT^tR^t$, wherein:

$R^t$ forms a product with an arbitrary vector having 6 points using at most 2 additions and/or subtractions;

$P^t$ comprises a permutation matrix;

a tensor product between a ISDCT matrix on 2 points ($S_2^t$) and a ISDCT matrix on 3 points ($S_3^t$) form $S_{(2 \otimes 3)}{}^t$;

$T^t$ is the transpose of $T = D_{2 \otimes 3}{}^{-1}R[(E_2^{-1}D_2) \otimes (E_3^{-1}D_3)]R^{-1}$ wherein $E_2$ and $E_3$ are initial factors, and $D_2$ and $D_2$ are secondary factors for scaled transform matrices on 2 and 3 points respectively, and $D_{(2 \otimes 3)} = (E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling step absorbs $D_{(2 \otimes 3)}$ and a reduction factor;

converting said YUV data into RGB form data; and applying said RGB data to said monitor input to display said image on said monitor.

32. A method for displaying an image on a monitor, comprising:

sensing coded data representing said image from a data channel;

decoding said sensed data into DCT form data having 6×6 point subblocks;

descaling said DCT form data;

converting said DCT data into YUV data by multiplying a plurality of subsets of said DCT data having 6 points by a factored transform matrix $S_6^{-1}$;

said factored transform matrix $S_6^{-1}$ being the product of: $P^{-1}S_{(2 \otimes 3)}{}^{-1}T^{-1}R^{-1}$, wherein:

$R^{-1}$ forms a product with an arbitrary vector having 6 points using at most 2 additions and/or subtractions;

$P^{-1}$ comprises a permutation matrix;

a tensor product between a ISDCT matrix on 2 points ($S_2^{-1}$) and a ISDCT matrix on 3 points ($S_3^{-1}$) form $S_{(2 \otimes 3)}{}^{-1}$;

$T^{-1}$ is the inverse $T = D_{2 \otimes 3}{}^{-1}R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)} = (E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_3) \otimes (E_2^{-1}D_3)]$;

said descaling step absorbs $D_{(2 \otimes 3)}{}^{-1}$ and a reduction factor;

converting said YUV data into RGB form data; and applying said RGB data to said monitor input to display said image on said monitor.

33. A method for displaying an image on a monitor, comprising:

sensing coded data representing said image from a data channel;

decoding said sensed data into DCT Form data having 6×6 point subblocks;

descaling said DCT form data;

converting said DCT data into YUV data by multiplying a plurality of subsets of said DCT data having 36 points by a factored transform matrix $S_6^t$;

said factored transform matrix $S_6^t$ being the product of: $(P^t \otimes P^t)(S_{(2 \otimes 3)}{}^t \otimes S_{(2 \otimes 3)}{}^t)(T^t \otimes T^t)(R^t \otimes R^t)$, wherein:

$R^t$ forms a product with an arbitrary vector having 6 points using at most 2 additions and/or subtractions;

$P^t$ comprises a permutation matrix;

a tensor product between a ISDCT matrix on 2 points ($S_2^t$) and a ISDCT matrix on 3 points ($S_3^t$) form $S_{(2 \otimes 3)}{}^t$;

$T^t$ is the transpose of the matrix $T = D_{2 \otimes 3}{}^{-1}R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)} = (E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling step absorbs $D_{(2\otimes 3)}$ and a reduction factor;

converting said YUV data into RGB form data; and applying said RGB data to said monitor input to display said image on said monitor.

34. A method for displaying an image on a monitor, comprising:

sensing coded data representing said image from a data channel;

decoding said sensed data into DCT form data having 6×6 point subblocks;

descaling said DCT form data;

converting said DCT data into YUV data by multiplying a plurality of subsets of said DCT data having 36 points by a factored transform matrix $S_6^-$;

said factored transform matrix $S_6^{-1}$ being the product of: $(P^{-1} \otimes P^{-1})$ $(S_{(2\otimes 3)}^{-1} \otimes S_{(2\otimes 3)}^{-1})$ $(T^{-1} \otimes T^{-1})$ $(R^{-1} \otimes R^{-1})$, wherein
  $R^{-1}$ forms a product with an arbitrary vector having 6 points using at most 2 additions and/or subtractions;
  $P^{-1}$ comprises a permutation matrix;
  a tensor product between a ISDCT matrix on 2 points($S_2^{-1}$) and a ISDCT matrix on 3 points ($S_3^{-1}$) form $S_{(2\otimes 3)}^{-1}$;
  $T^{-1}$ is the inverse of the matrix $T=D_{2\otimes 3}^{-1} R[(E_2^{-1}D_2)\otimes(E_3^{-1}D_3)]R^{-1}$ wherein $E_2$ and $E_3$ are initial factors, and $D_2$ and $D_3$ are secondary factors for scaled transform matrices on 2 and 3 points respectively, and
  $D_{(2\otimes 3)}=(E_2 \otimes E_3)\tilde{D}_{(2\otimes 3)}$; and where
  $\tilde{D}_{2\otimes 3}$ comprises a 6×6 diagonal matrix having each j,j-th term selected from any of the non-zero entries in the j-th row of $R[(E_2^{-1}D_2)\otimes(E_3^{-1}D_3)]$;

said descaling step absorbs $D_{(2\otimes 3)}$, and a reduction factor;

converting said YUV data into RGB form data; and applying said RGB data to said monitor input to display said image on said monitor.

35. A method for displaying an image on a monitor, comprising:

sensing coded data representing said image from a data channel;

decoding said sensed data into DCT form data having 8×8 point subblocks;

descaling the leading (top, left) 6×6 subblocks of all 8×8 subblocks of said DCT form data;

converting said DCT data into YUV data by multiplying a plurality of subsets of said DCT data having 6 points by a factored transform matrix $S_6^6$;

said factored transform matrix $S_6^t$ being the product of: $P^t S_{(2\otimes 3)} T^t R^t$, wherein
  $R^t$ forms a product with an arbitrary vector having 6 points using at most 2 additions and/or subtractions;
  $P^t$ comprises a permutation matrix;
  a tensor product between a ISDCT matrix on 2 points ($S_2^t$) and a ISDCT matrix on 3 points ($S_3^t$) form $S_{(2\otimes 3)}^t$;
  $T^t$ is the transpose of $T=D_{2\otimes 3}^{-1} R[(E_2^{-1}D_2)\otimes(E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2\otimes 3)}=(E_2\otimes E_3)\tilde{D}_{(2\otimes 3)}$, and where $\tilde{D}_{2\otimes 3}$ comprises a 6×6 diagonal matrix having each j,j-th term selected from any of the non-zero entries in the j-th row of $R[(E_2^{-1}D_2)\otimes(E_3^{-1}D_3)]$;

said descaling step absorbs $D_{(2\otimes 3)}$ and a reduction factor;

converting said YUV data into RGB form data; and applying said RGB data to said monitor input to display said image on said monitor.

36. A method for displaying an image on a monitor, comprising:

sensing coded data representing said image from a data channel;

decoding said sensed data into DCT form data having 8×8 point subblocks;

descaling the leading (top, left) 6×6 subblocks of all 8×8 subblocks of said DCT form data;

converting said DCT data into YUV data by multiplying a plurality of subsets of said DCT data having 6 points by a factored transform matrix $S_6^{-1}$;

said factored transform matrix $S_6^{-1}$ being the product of: $P^{-1}S_{(2\otimes 3)}^{-1}T^{-1}R^{-1}$, wherein:
  $R^{-1}$ forms a product with an arbitrary vector having 6 point using at most 2 additions and/or subtractions;
  $P^{-1}$ comprises a permutation matrix;
  a tensor product between a ISDCT matrix on 2 points ($S_2^{-1}$) and a ISDCT matrix on 3 points ($S_3^{-1}$) form $S_{(2\otimes 3)}^{31\ 1}$;
  $T^{-1}$ is the inverse $T=D_{2\otimes 3}^{-1}R[(E_2^{-1}D_d)\otimes(E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2\otimes 3)}=(E_2\otimes E_3)\tilde{D}_{(2\otimes 3)}$; and where $\tilde{D}_{2\otimes 3}$ comprises a 6×6 diagonal matrix having each j,j-th term selected from any of the non-zero entries in the j-th row of $R[(E_2^{-1}D_2)\otimes(E_3^{-1}D_3)]$;

said descaling step absorbs $D_{(2\otimes 3)}^{-1}$ and a reduction factor;

converting said YUV data into RGB form data; and applying said RGB data to said monitor input to display said image on said monitor.

37. A method for displaying an image on a monitor, comprising:

sensing coded data representing said image from a data channel;

decoding said sensed data into DCT form data having 8×8 point subblocks;

descaling the leading (top, left) 6×6 subblocks of all 8×8 subblocks of said DCT form data;

converting said DCT data into YUV data by multiplying a plurality of sub-sets of said DCT data having 36 points by a factored transform matrix $S_6^t$;

said factored transform matrix $S_6^t$ being the product of: $(P^t \otimes P^t)(S_{(2\otimes 3)}^t \otimes S_{(2\otimes 3)}^t)(T^t \otimes T^t)(R^t \otimes R^t)$, wherein:
  $R_t$ forms a product with an arbitrary vector having 6 points using at most 2 additions and/or subtractions;
  $P^t$ comprises a permutation matrix;
  a tensor product between a ISDCT matrix on 2 points ($S_2^t$) and a ISDCT matrix on 3 points ($S_3^t$) form $S_{(2\otimes 3)}^t$;
  $T^t$ is the transpose of the matrix $T=D_{2\otimes 3}^{-1}R[(E_2^{-1}D_2)\otimes(E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling step absorbs $D_{(2 \otimes 3)}$ and a reduction factor;

converting said YUV data into RGB form data; and applying said RGB data to said monitor input to display said image on said monitor.

38. A method for displaying an image on a monitor, comprising:

sensing coded data representing said image from a data channel;

decoding said sensed data into DCT form data having 8×8 point subblocks; descaling the leading (top, left) 6×6 subblocks of all 8×8 subblocks of said DCT form data;

converting said DCT data into YUV data by multiplying a plurality of sub-sets of said DCT data having 36 points by a factored transform matrix $S_6^{-1}$;

said factored transform matrix $S_6^{-1}$ being the product of: $(P^{-1} \otimes P^{-1})(S_{(2 \otimes 3)}^{-1} \otimes S_{(2 \otimes 3)}^{-1})(T^{-1} \otimes T^{-1})(R^{-1} \otimes R^{-1})$, wherein $R^{-1}$ forms a product with an arbitrary vector having 6 points using at most 2 additions and/or subtractions;

$P^{-1}$ comprises a permutation matrix;

a tensor product between a ISDCT matrix on 2 points ($S_2^{-1}$) and a ISDCT matrix on 3 points ($S_3^{-1}$) form $S_{(2 \otimes 3)}^{-1}$);

$T^{-1}$ is the inverse of the matrix $T = D_{2 \otimes 3}^{-1} R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling step absorbs $D_{(2 \otimes 3)}$ and a reduction factor;

converting said YUV data into RGB form data; and applying said RGB data to said monitor input to display said image on said monitor.

39. A transmitter for transmitting an image over a data channel, comprising:

a first transform means for transforming RGB form data into YUV data;

a second transform means for converting said YUV data into DCT data by multiplying a factored transform matrix $S_k$ to a plurality of subsets of said YUV data having k points wherein k=pq and p and q are relatively prime integers;

said factored transform matrix $S_k$ being the product of: $RTS_{(p \otimes q)}P$, wherein:

R forms a product with an arbitrary vector having pq points using at most pq−p−q+1 additions and/or subtractions;

P comprises a permutation matrix;

a tensor product between a SDCT matrix on p points ($S_p$) and a SDCT matrix on q points ($S_q$) form $S_{(p \otimes q)}$;

$T = D_{p \otimes q}^{-1} R[(E_q^{-1}D_p) \otimes (E_q^{-1}D_4)]R^{-1}$ wherein $E_p$, and $E_q$ are initial factors, and $D_p$, and $D_q$ are secondary factors for scaled transform matrices on p and q points respectively, and $D_{(p \otimes q)}=(E_p \otimes E_q) \tilde{D}_{(p \otimes q)}$; and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

a quantization means quantizing said DCT data;

a conversion means for converting said quantized DCT data into signals for transmission over said data channel; and a driver means for applying said signals to said data channel.

40. A transmitter for transmitting an image over a data channel, as in claim 39, wherein:

said quantization means absorbs $D_{(p \otimes q)}$.

41. A transmitter for transmitting an image over a data channel, as in claim 40, wherein:

a shift and add step multiplies said YUV data by a close approximation to $\sqrt{3}$.

42. A transmitter for transmitting an image over a data channel, as in claim 40, wherein:

each of said plurality of subsets of said YUV data has 6 points.

43. A transmitter for transmitting an image over a data channel, as in claim 40, wherein:

each of said plurality of subsets of said YUV data has 12 points.

44. A transmitter for transmitting an image over a data channel, comprising:

a first transform means for transforming said RGB form data into YUV data;

a second transform means for converting said YUV data into DCT data by multiplying a factored transform matrix $S_k$ to a plurality of subsets of said YUV data having k x k points wherein k=pq and p and q are relatively prime integers;

said factored transform matrix $S_k$ being the product of: $(R \otimes R)(T \otimes T)(S_{(p \otimes q)} \otimes S_{(p \otimes q)})(P \otimes P)$, wherein:

R forms a product with an arbitrary vector having pq points using at most pq−p−q+1 additions and/or subtractions;

P comprises a permutation matrix;

a tensor product between a SDCT matrix on p points ($S_p$) and a SDCT matrix on q points ($S_q$) form $S_{(p \otimes q)}$;

$T = D_{p \otimes q}^{-1} R[(E_q^{-1}D_q) \otimes (E_p^{-1}D_p)]R^{-1}$ wherein $E_p$ and $E_q$ are initial factors, and $D_p$ and $D_q$ are secondary factors for scaled transform matrices on p and q points respectively, and $D_{(p \otimes q)}=(E_p \otimes E_q) \tilde{D}_{(p \otimes q)}$; and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

a quantization means for quantizing said DCT data;

a conversion means for converting said quantized DCT data into signals for transmission over said data channel; and a driver means for applying said signals to said data channel.

45. A transmitter for transmitting an image over a data channel, as in claim 44, wherein:

said quantization means absorbs $D_{p \otimes q}$.

46. A transmitter for transmitting an image over a data channel, as in claim 45, wherein:

a shift and add step multiplies said YUV data by a close approximate to $\sqrt{3}$.

47. A transmitter for transmitting an image over a data channel, as in claim 45, wherein:

each of said plurality of subsets of said YUV data has 36 points.

48. A transmitter for transmitting an image over a data channel, as in claim 45, wherein:

each of said plurality of subsets of said YUV data has 144 points.

49. A display system for displaying an image on a monitor, comprising:

a sensor for sensing coded data representing said image from a data channel;

a decoder for decoding said sensed data into DCT form data;

a descaling means for descaling said DCT form data;

a first transform means for converting said DCT data into YUV data by multiplying a plurality of subsets of said DCT data having k points by factored transform matrix $S_k^t$, wherein k=pq and p and q are relatively prime integers;

said factored transform matrix $S_k^t$ being the product of: $P^t S_{(p \otimes q)}^t T^t R^t$, wherein:

$R^t$ forms a product with an arbitrary vector having pq points using at most pq–p–q+1 additions and/or subtractions;

$P^t$ comprises a permutation matrix;

a tensor product between an ISDCT matrix on p points ($S_p^t$) and an ISDCT matrix on q points ($S_q^t$) form $S_{(p \otimes q)}^t$;

$T^t$ is the transpose of $T = D_{p \otimes q}^{-1} R[(E_p^{-1}D_p) \otimes (E_q^{-1}D_q)]R^{-1}$ wherein $E_p$ and $E_q$ are initial factors, and $D_p$ and $D_q$ secondary factors for scaled transform matrices on p and q points respectively, and $D_{(p \otimes q)} = (E_p \otimes E_q) \tilde{D}_{(p \otimes q)}$; and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

a second transform means for converting said YUV data into RGB form data; and a driver means for applying said RGB data to said monitor input to display said image on said monitor.

50. A display system for displaying an image on a monitor, comprising:

a sensor for sensing coded data representing said image from a data channel;

a decoder for decoding said sensed data into DCT form data;

a descaling means for descaling said DCT form data;

a first transform means for converting said DCT data into YUV data by multiplying a plurality of subsets of said DCT data having k points by factored transform matrix $S_k^{-1}$, wherein k=pq and p and q are relatively prime integers;

said factored transform matrix $S_k^{-1}$ being the product of: $P^t S_{(p \otimes q)}^{-1} T^{-1} R^{-1}$, wherein:

$R^{-1}$ forms a product with an arbitrary vector having pq points using at most pq–p–q+1 additions and/or subtractions;

$P^t$ comprises a permutation matrix;

a tensor product between an ISDCT matrix on p points ($S_p^{-1}$) and an ISDCT matrix on q points ($S_q^{-1}$) form $S_{(p \otimes q)}^{-1}$;

$T^{-1} = R[(E_p^{-1}D_p) \otimes (E_q^{-1}D_q)]^{-1} R^{-1} D_{p \otimes q}$ wherein $E_p$, and $E_q$ are initial factors, and $D_p$ and $D_q$ are secondary factors for scaled transform matrices on p and q points respectively, and $D_{(p \otimes q)} = (E_p \otimes E_q) \tilde{D}_{(p \otimes q)}$, and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

a second transform means for converting said YUV data into RGB form data; and a driver means for applying said RGB data to said monitor input to display said image on said monitor.

51. A display system for displaying an image on a monitor, as in claim 49 wherein:

said descaling means absorbs $D_{(p \otimes q)}$.

52. A display system for displaying an image on a monitor, as in claim 50, wherein:

said descaling means absorbs $D_{(p \otimes q)}$.

53. A display system for displaying an image on a monitor, as in claim 51, wherein:

a shift and add step multiplies said YUV data by a close approximate to $\sqrt{3}$.

54. A display system for displaying an image on a monitor, as in claim 52, wherein:

a shift and add step multiplies said YUV data by a close approximate to $\sqrt{3}$.

55. A method for displaying an image on a monitor, as in claim 51, wherein:

each of said plurality of subsets of said YUV data has 6 points.

56. A method for displaying an image on a monitor, as in claim 52, wherein:

each of said plurality of subsets of said YUV data has 6 points.

57. A method for displaying an image on a monitor, as in claim 51, wherein:

each of said plurality of subsets of said YUV data has 12 points.

58. A method for displaying an image on a monitor, as in claim 52, wherein:

each of said plurality of subsets of said YUV data has 12 points.

59. A display system for displaying an image on a monitor, comprising: a sensor means for sensing coded data representing said image from a data channel;

a decoder means for decoding said sensed data into DCT form data;

a descaling means for descaling said DCT form data;

a first transform means for converting said DCT data into YUV data by multiplying a plurality of subsets of said DCT data having k×k points by a factored transform matrix $S_k^t$ wherein k=pq and p and q are relatively prime integers;

said factored transform matrix $S_k^t$ being the product of: $(P^t \otimes P^t)(S_{(p \otimes q)}^t)(T^t \otimes T^t)(R^t \otimes R^t)$, wherein:

$R^t$ forms a product with an arbitrary vector having pq points using at most pq–p–q+1 additions and/or subtractions;

$P^t$ comprises a permutation matrix;

a tensor product between a ISDCT matrix on p points ($S_p^t$) and a ISDCT matrix on q points ($S_q^t$) form $S_{(p \otimes q)}^t$;

$T^t$ is the transpose of $T = D_{p \otimes q}^{-1} R[(F_p^{-1}D_p) \otimes (E_q^{-1}D_q)]R^{-1}$ wherein $E_p$ and $E_q$ are initial factors, and $D_p$ and $D_q$ are secondary factors for scaled transform matrices on p and q points respectively, and $D_{(p \otimes q)} = (E_p \otimes E_q)\tilde{D}_{(p \otimes q)}$; and where $\tilde{D}_{p \otimes q}$ comprises a pq×pq diagonal matrix having each j,j-th term selected from any of tile non-zero entries in the j-th row of $R[(E_p^{-1}D_p) \otimes (E_q^{-1}D_q)]$;

a second transform means for converting said YUV data into RGB form data; and a driver means for applying said RGB data to said monitor input to display said image on said monitor.

60. A display system for displaying an image on a monitor, comprising:

a sensor means for sensing coded data representing said image from a data channel;

a decoder means for decoding said sensed data into DCT form data;

a descaling means for descaling said DCT form data;

a first transform means for converting said DCT data into YUV data by multiplying a plurality of subsets of said DCT data having k×k points by a factored transform matrix $S_k^{-1}$ wherein k=pq and p and q are relatively prime integers;

said factored transform matrix $S_k^{-1}$ being the product of: $(P^{-1} \otimes P^{-1})(S_{p \otimes q}^{-1} \otimes_{(p \otimes q)})(T^{-1} \otimes T^{-1})(R^{-1} \otimes R^{-1})$, wherein:

$R^{-1}$ forms a product with an arbitrary vector having pq points using at most pq−p−q+1 additions and/or subtractions;

$P^{-1}$ comprises a permutation matrix;

a tensor product between a ISDCT matrix on p points ($S_p^t$) and a ISDCT matrix on q points ($S_q^t$) form $S_{(p \otimes q)}^{-1}$;

$T^{-1}$ is the inverse of $T = D_{(p \otimes q)}^{-1} R[(E_p^{-1}D_p) \otimes (E_q^{-1}D_q)]R^{-1}$ wherein $E_p$ and $E_q$ are initial factors, and $D_p$ and $D_q$ are secondary factors for scaled transform matrices on p and q points respectively, and $D_{(p \otimes q)} = (E_p \otimes E_q)\tilde{D}_{(p \otimes q)}$; and where $\tilde{D}_{p \otimes q}$ comprises a pq×pq diagonal matrix having each j,j-th term selected from any of the non-zero entries in the j-th row of $R[(E_p^{-1}D_p) \otimes (E_q^{-1}D_q)]$;

a second transform means for converting said YUV data into RGB form data; and a driver means for applying said RGB data to said monitor input to display said image on said monitor.

61. A display system for displaying an image on a monitor, as in claim 59, wherein:

said descaling means absorbs $D_{(p \otimes q)}$.

62. A display system for displaying an image on a monitor, as in claim 60, wherein:

said descaling means absorbs $D_{(p \otimes q)}$.

63. A display system for displaying an image on a monitor, as in claim 61, wherein:

a shift and add step multiplies said YUV data by a slose approximation to $\sqrt{3}$.

64. A display system for displaying an image on a monitor, as in claim 62, wherein:

a shift and add step multiplies said YUV data by a slose approximation to $\sqrt{3}$.

65. A display system for displaying an image on a monitor, as in claim 61, wherein:

each of said plurality of subsets of said YUV data has 36 points.

66. A display system for displaying an image on a monitor, as in claim 62, wherein:

each of said plurality of subsets of said YUV data has 36 points.

67. A display system for displaying animage on a monitor, as in claim 61, wherein:

each of said plurality of subsets of said YUV data has 144 points.

68. A display system for displaying an image on a monitor, as in claim 62, wherein:

each of said plurality of subsets of said YUV data has 144 points.

69. A display system for displaying an image on a monitor, comprising:

a sensor means for sensing coded data representing said image from a data channel;

a decoding means for decoding said sensed data into DCT form data having 6×6 point subblocks;

descaling means for descaling said DCT form data;

a first transform means for converting said DCT data into YUV data by multiplying a plurality of subsets of said DCT data having 6 points by a factored transform matrix $S_6^{t}$;

said factored transform matrix $S_6^{t}$ being the product of: $P^t S_{(2 \otimes 3)} T^t R^t$, wherein:

$R^t$ forms a product with an arbitrary vector having 6 points using at most 2 additions and/or subtractions;

$P^t$ comprises a permutation matrix;

a tensor product between a ISDCT matrix on 2 points ($S_2^t$) and a ISDCT matrix on 3 points ($S_3^t$) form $S_{(2 \otimes 3)}^{t}$;

$T^t$ is the transpose of $T = D_{(2 \otimes 3)}^{-1} R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)} = (E_2 \otimes E_3)\tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

70. A display system for displaying an image on a monitor, comprising:

a sensor means for sensing coded data representing said image from a data channel;

a decoding means for decoding said sensed data into DCT form data having 6×6 point subblocks;

descaling means for descaling said DCT form data;

a first transform means for converting said DCT data into YUV data by multiplying a plurality of subsets of said DCT data having 6 points by a factored transform matrix $S_6^{-1}$;

said factored transform matrix $S_6^{-1}$ being the product of: $P^{-1} S_{(2 \otimes 3)}^{-1} T^{-1} R^{-1}$, wherein:

$R^{-1}$ forms a product with an arbitrary vector having 6 points using at most 2 additions and/or subtractions;

$P^{-1}$ comprises a permutation matrix;

a tensor product between a ISDCT matrix on 2 points $(S_2^{-1})$ and a ISDCT matrix on 3 points $(S_3^{-1})$ form $S_{(2 \otimes 3)}^{-1}$;

$T^{-1}$ is the inverse $T=D_{2 \otimes 3}^{-1}R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

71. A display system for displaying an image on a monitor, comprising:

a sensor means for sensing coded data representing said image from a data channel;

a decoder means for decoding said sensed data into DCT form data having 6×6 point subblocks;

a descaling means for descaling said DCT form data;

a first transform means for converting said DCT data into YUV data by multiplying a factored transform matrix $S_6^t$ by a plurality of subsets of said DCT data having 36 points;

said factored transform matrix $S_6^t$ being the product of $(P^t \otimes P^t)(S_{(2 \otimes 3)}^t)(T^t \otimes T^t)(R^t \otimes R^t)$ wherein:

$R^t$ forms a product with an arbitrary vector having 6 points using at most 2 additions and/or subtractions;

$P^t$ comprises a permutation matrix;

a tensor product between a ISDCT matrix on 2 points $(S_2^t)$ and a ISDCT matrix on 3 points $(S_3^t)$ form $S_{(2 \otimes 3)}^t$;

$T^t$ is the transpose of the matrix $T=D_{2 \otimes 3}^{-1}R[(E_2^{-1}D_2) \otimes (E_2^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1}D_3)]$;

said descaling means absorbs $D_{(2 \otimes 3)}$ and a reduction factor;

a second transform means for converting said YUV data into RGB form data;, and a driver means for applying said RGB data to said monitor input to display said image on said monitor.

72. A display system for displaying) an image on a monitor, comprising;

a sensor means for sensing coded data representing said image from a data channel;

a decoder means for decoding said sensed data into DCT form data having 6×6 point subblocks;

a descaling means for descaling said DCT form data;

a first transform means for converting said DCT data into YUV data by multiplying a factored transform matrix $S_6^{-1}$ by a plurality of subsets of said DCT data having 36 points;

said factored transform matrix $S_6^{-1}$ being the product of: $(P^{-1}P^{-1})(S_{(2 \otimes 3)}^{-1} \otimes S_{(2 \otimes 3)}^{-1}) \; (T^{-1} \otimes T^{-)(R^{-1}} \otimes R^{-1})$, wherein $R^{-1}$ forms a product with an arbitrary vector having 6 points using at most 2 additions and/or subtractions;

$P^{-1}$ comprises a permutation matrix;

a tensor product between a ISDCT matrix on 2 points $(S_2^{-1})$ and a ISDCT matrix on 3 points $(S_3^{-1})$ form $S_{(2 \otimes 3)}^{-1}$;

$T^{-1}$ is the inverse of the matrix $T=D_{2 \otimes 3}^{-1}R[(E_2^{-1}D_2) \otimes (E_3^{-1}D_3)]R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3) \tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_D) \otimes (E_3^{-1}D_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

73. A display system for displaying an image on a monitor, comprising:

a sensor means for sensing coded data representing said image from a data channel;

a decoder means for decoding said sensed data into DCT form data having 8×8 point subblocks;

a descaling means for descaling the leading (top, left) 6×6 subblocks of all 8×8 subblocks of said DCT form data;

a first transform means for converting said DCT data into YUV data by multiplying a factored transform matrix $S_6^t$ by a plurality of subsets of said DCT data having 6 points;

said factored transform matrix $S_6^t$ being the product of $P^tS_{(2 \otimes 3)}^tT^tR^t$, wherein:

$R^t$ forms a product with an arbitrary vector having 6 points using at most 2 additions and/or subtractions;

$P^t$ comprises a permutation matrix;

a tensor product between a ISDCT matrix on 2 points $(S_2^t)$ and a ISDCT matrix on 3 points $(S_3^t)$ form $S_{(2 \otimes 3)}^t$;

$T^t$ is the transpose of $T=D_{2 \otimes 3}^{-1}R[(F_2^{-1}D_3) \otimes (E_3^{-1}D_3)R^{-1}$ wherein $E_2$ and $E_3$ are initial factors, and $D_2$ and $D_3$ are secondary factors for scaled transform matrices on 2 and 3 points respectively, and $D_{(2 \otimes 3)}=(E_2 \otimes E_3)\tilde{D}_{(2 \otimes 3)}$; and where $\tilde{D}_{2 \otimes 3}$ comprises a 6×6 diagonal matrix having each j,j-th term selected from any of the non-zero entries in the j-th row of $R[(E_2^{-1}D_2) \otimes (E_3^{-1D}_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

74. A display system for displaying an image on a monitor, comprising:

a sensor means for sensing coded data representing said image from a data channel;

a decoder means for decoding said sensed data into DCT form data having 8×8 point subblocks;

a descaling means for descaling the leading (top, left) 6×6 subblocks of all 8×8 subblocks of said DCT Form data;

a first transform means For converting said DCT data into YUV data by multiplying a factored transform matrix $S_6^{-1}$ by a plurality of subsets of said DCT data having 6 points;

said factored transform matrix $S_6^{-1}$ being the product of: $P^{-1} S_{(2 \otimes 3)}^{-1} T^{-1} R^{-1}$, wherein:

$R^{-1}$ forms a product with an arbitrary vector having 6 points using at most 2 additions and/or subtractions;

$P^{-1}$ comprises a permutation matrix;

a tensor product between a ISDCT matrix on 2 points ($S_2^{-1}$) and a ISDCT matrix on 3 points ($S_3^{-1}$) form $S_{(2 \otimes 3)}^{-1}$;

$T^{-1}$ is the inverse $T = D_{(2 \otimes 3)}^{-1} R[(E_2^{-1} D_2) \otimes (E_3^{-1} D_3)] R^{-1}$ wherein $E_2$ and $E_3$ are initial factors, and $D_2$ and $D_3$ are secondary factors for scaled transform matrices on 2 and 3 points respectively, and $D_{(2 \otimes 3)} = (E_2 \otimes E_3) \tilde{D}_{(2 \otimes 3)}$, and where $\tilde{D}_{2 \otimes 3}$ comprises a 6×6 diagonal matrix having each j,j-th term selected from any of the non-zero entries in the j-th row of $R[(E_2^{-1} D_2) \otimes (E_3^{-1} D_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

75. A display system for displaying an image on a monitor, comprising:

a sensor means for sensing coded data representing said image from a data channel;

a decoder means for decoding said sensed data into DCT form data having 8×8 point subblocks;

a descaling means for descaling the leading (top, left) 6×6 subblocks of all 8×8 subblocks of said DCT form data;

a first transform means for converting said DCT data into YUV data by multiplying a factored transform matrix $S_6'$ by a plurality of subsets of said DCT data having 36 points;

said factored transform matrix $S_6'$ being the product of: $(P' \otimes P')(S_{(2 \otimes 3)}' \otimes S_{(2 \otimes 3)}')(T' \otimes T')(R' \otimes R')$, wherein:

$R'$ forms a product with an arbitrary vector having 6 points using at most 2 additions and/or subtractions;

$P'$ comprises a permutation matrix;

a tensor product between a ISDCT matrix on 2 points ($S_2'$) and a ISDCT matrix on 3 points ($S_3'$) form $S_{(2 \otimes 3)}'$;

$T'$ is the transpose of the matrix $T = D_{(2 \otimes 3)}^{-1} R[(E_2^{-1} D_2) \otimes (E_3^{-1} D_3)] R^{-1}$ wherein $E_2$ and $E_3$ are initial factors, and $D_2$ and $D_3$ are secondary factors for scaled transform matrices on 2 and 3 points respectively, and $D_{(2 \otimes 3)} = (E_2 \otimes E_3) \tilde{D}_{(2 \otimes 3)}$; and where $\tilde{D}_{(2 \otimes 3)}$ comprises a 6×6 diagonal matrix having each j,j-th term selected from any of the non-zero entries in the j-th row of $R[(E_2^{-1} D_2) \otimes (E_3^{-1} D_3)]$;

said descaling means absorbs $D_{(2 \otimes 3)}$ and a reduction factor;

a second transform means for converting said YUV data into RGB form data; and a driver means for applying said RGB data to said monitor input to display said image on said monitor.

76. A display system for displaying an image on a monitor, comprising;

a sensor means for sensing coded data representing said image from a data channel;

a decoder means for decoding said sensed data into DCT form data having 8×8 point subblocks;

a descaling means for descaling the leading (top, left) 6×6 stubblocks of all 8×8 subblocks of said DCT form data;

a first transform means for converting said DCT data into YUV data by multiplying a factored transform matrix $S_6^{-1}$ by a plurality of subsets of said DCT data having 36 points;

said factored transform matrix $S_6^{-1}$ being the product of: $(P^{-1} \otimes P^{-1})(S_{(2 \otimes 3)}^{-1} \otimes S_{(2 \otimes 3)}^{-1})(T^{-1} \otimes T^{-1})(R^{-1} \otimes R^{-1})$, wherein $R^{-1}$ forms a product with an arbitary vector having 6 points using at most 2 additions and/or subtractions;

$P^{-1}$ comprises a permutation matrix;

a tensor product between a ISDCT matrix on 2 points ($S_2^{-1}$) and a ISDCT matrix on 3 points ($S_3^{-1}$) form $S_{(2 \otimes 3)}^{-1}$;

$T^{-1}$ is the inverse of the matrix $T = D_{(2 \otimes 3)}^{-1} R[(E_2^{-1} D_2) \otimes (E_3^{-1} D_3 0] R^{-1}$ wherein $E_2$ and $E_3$ are initial Factors, arid $D_2$ and $D_3$ are secondary factors for scaled transform matrices on 2 and 3 points respectively, and $D_{(2 \otimes 3)} = (E_2 \otimes E_3) \tilde{D}_{(2 \otimes 3)}$; and where $\tilde{D}_{(2 \otimes 3)}$ comprises a 6×6 diagonal matrix having each j,j-th term selected from any of the non-zero entries in the j-th row of $R[(E_2^{-1} D_2) \otimes (E_3^{-1} D_3)]$;

said descaling means absorbs $D_{(2 \otimes 3)}$ and a reduction factor;

a second transform means for convertilig said YUV data into RGB form data; and a driver means for applying said RGB data to said monitor input to display said image on said monitor.

\* \* \* \* \*